United States Patent
Sengoku et al.

(10) Patent No.: US 9,444,612 B2
(45) Date of Patent: *Sep. 13, 2016

(54) MULTI-WIRE SINGLE-ENDED PUSH-PULL LINK WITH DATA SYMBOL TRANSITION BASED CLOCKING

(71) Applicant: QUALCOMM Incorporated, San Diego, CA (US)

(72) Inventors: Shoichiro Sengoku, San Diego, CA (US); George Alan Wiley, San Diego, CA (US); Joseph Cheung, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/834,219

(22) Filed: Aug. 24, 2015

(65) Prior Publication Data
US 2015/0365226 A1    Dec. 17, 2015

Related U.S. Application Data

(62) Division of application No. 14/205,242, filed on Mar. 11, 2014, now Pat. No. 9,118,457.

(60) Provisional application No. 61/793,955, filed on Mar. 15, 2013.

(51) Int. Cl.
| | |
|---|---|
| *H04L 7/00* | (2006.01) |
| *H04L 7/027* | (2006.01) |
| *G06F 13/40* | (2006.01) |
| *G06F 13/42* | (2006.01) |
| *H04L 25/14* | (2006.01) |
| *H04L 25/00* | (2006.01) |

(52) U.S. Cl.
CPC ........... *H04L 7/027* (2013.01); *G06F 13/4072* (2013.01); *G06F 13/4295* (2013.01); *H04L 25/00* (2013.01); *H04L 25/14* (2013.01)

(58) Field of Classification Search
CPC ........... G06F 13/4295; G06F 13/4072; G06F 13/4282; G06F 13/4291; H04L 25/14; H04L 7/033; H04L 7/027; H04L 25/00; H04L 7/0012; H04L 7/00; H04L 7/0054; H04L 27/2608; H04L 7/0091; H04L 12/40052
USPC ............... 375/260, 355, 257; 326/86, 87, 82
See application file for complete search history.

(56) References Cited

U.S. PATENT DOCUMENTS

| | | | |
|---|---|---|---|
| 8,649,460 B2 | 2/2014 | Ware et al. | |
| 9,118,457 B2 * | 8/2015 | Sengoku | H04L 7/027 |
| 2005/0141661 A1 | 6/2005 | Renaud et al. | |

FOREIGN PATENT DOCUMENTS

| | | |
|---|---|---|
| TW | 200707963 A | 2/2007 |
| TW | 201002079 A | 1/2010 |
| WO | WO-2011126210 A2 | 10/2011 |

OTHER PUBLICATIONS

Taiwan Search Report—TW103109203—TIPO—May 22, 2015.
International Search Report and Written Opinion—PCT/US2014/024704—ISA/EPO—Jul. 1, 2014.

* cited by examiner

*Primary Examiner* — Rahel Guarino
(74) *Attorney, Agent, or Firm* — Loza & Loza, LLP

(57) ABSTRACT

System, methods and apparatus are described that facilitate transmission of data over a multi-wire data communications link, particularly between two devices within an electronic apparatus. A sequence of data bits is converted into M transition numbers, which are then converted into a sequence of symbols. The sequence of symbols is transmitted received over N wires. A clock signal may be effectively embedded in the transmission of the sequence of symbols. Each of the sequence of symbols may be selected based on a corresponding one of the M transition numbers and a value of a preceding one of the sequence of symbols.

24 Claims, 25 Drawing Sheets

1300

T utilization: n=2, radix=3 (=$2^2$-1)

| n | Utilization % | Symbol/group | bits/group | int(bpg) | bits/cycle | bits/wire |
|---|---|---|---|---|---|---|
| 2 | 99.90 | 24 | 38.0391 | 38 | 1.5833 | 0.7917 |
| 2 | 99.90 | 12 | 19.0196 | 19 | 1.5833 | 0.7917 |
| 2 | 99.73 | 31 | 49.1338 | 49 | 1.5806 | 0.7903 |
| 2 | 99.62 | 19 | 30.1143 | 30 | 1.5789 | 0.7895 |
| 2 | 99.49 | 26 | 41.2090 | 41 | 1.5769 | 0.7885 |
| 2 | 99.15 | 28 | 44.3790 | 44 | 1.5714 | 0.7857 |
| 2 | 99.15 | 21 | 33.2842 | 33 | 1.5714 | 0.7857 |
| 2 | 99.15 | 14 | 22.1895 | 22 | 1.5714 | 0.7857 |
| 2 | 99.15 | 7 | 11.0947 | 11 | 1.5714 | 0.7857 |
| 2 | 98.85 | 30 | 47.5489 | 47 | 1.5667 | 0.7833 |
| 2 | 98.75 | 23 | 36.4541 | 36 | 1.5652 | 0.7826 |
| 2 | 98.58 | 32 | 50.7188 | 50 | 1.5625 | 0.7812 |
| 2 | 98.58 | 16 | 25.3594 | 25 | 1.5625 | 0.7812 |
| 2 | 98.43 | 25 | 39.6241 | 39 | 1.5600 | 0.7800 |
| 2 | 98.14 | 27 | 42.7940 | 42 | 1.5556 | 0.7778 |
| 2 | 98.14 | 18 | 28.5293 | 28 | 1.5556 | 0.7778 |
| 2 | 98.14 | 9 | 14.2647 | 14 | 1.5556 | 0.7778 |
| 2 | 97.90 | 29 | 45.9639 | 45 | 1.5517 | 0.7759 |
| 2 | 97.79 | 20 | 31.6993 | 31 | 1.5500 | 0.7750 |
| 2 | 97.51 | 22 | 34.8692 | 34 | 1.5455 | 0.7727 |
| 2 | 97.51 | 11 | 17.4346 | 17 | 1.5455 | 0.7727 |
| 2 | 97.07 | 13 | 20.6045 | 20 | 1.5385 | 0.7692 |
| 2 | 96.74 | 15 | 23.7744 | 23 | 1.5333 | 0.7667 |
| 2 | 96.50 | 17 | 26.9444 | 26 | 1.5294 | 0.7647 |
| 2 | 94.64 | 10 | 15.8496 | 15 | 1.5000 | 0.7500 |
| 2 | 94.64 | 8 | 12.6797 | 12 | 1.5000 | 0.7500 |
| 2 | 94.64 | 6 | 9.5098 | 9 | 1.5000 | 0.7500 |
| 2 | 94.64 | 4 | 6.3399 | 6 | 1.5000 | 0.7500 |
| 2 | 94.64 | 2 | 3.1699 | 3 | 1.5000 | 0.7500 |
| 2 | 88.33 | 5 | 7.9248 | 7 | 1.4000 | 0.7000 |
| 2 | 84.12 | 3 | 4.7549 | 4 | 1.3333 | 0.6667 |
| 2 | 63.09 | 1 | 1.5850 | 1 | 1.0000 | 0.5000 |

T utilization: n=3, radix=7 (=$2^3$-1)

| n | Utilization % | Symbol/group | bits/group | int(bpg) | bits/cycle | bits/wire |
|---|---|---|---|---|---|---|
| 3 | 99.97 | 31 | 87.0280 | 87 | 2.8065 | 0.9355 |
| 3 | 99.74 | 30 | 84.2206 | 84 | 2.8000 | 0.9333 |
| 3 | 99.74 | 25 | 70.1839 | 70 | 2.8000 | 0.9333 |
| 3 | 99.74 | 20 | 56.1471 | 56 | 2.8000 | 0.9333 |
| 3 | 99.74 | 15 | 42.1103 | 42 | 2.8000 | 0.9333 |
| 3 | 99.74 | 10 | 28.0735 | 28 | 2.8000 | 0.9333 |
| 3 | 99.74 | 5 | 14.0368 | 14 | 2.8000 | 0.9333 |
| 3 | 99.49 | 29 | 81.4133 | 81 | 2.7931 | 0.9310 |
| 3 | 99.44 | 24 | 67.3765 | 67 | 2.7917 | 0.9306 |
| 3 | 99.36 | 19 | 53.3397 | 53 | 2.7895 | 0.9298 |
| 3 | 99.23 | 28 | 78.6059 | 78 | 2.7857 | 0.9286 |
| 3 | 99.23 | 14 | 39.3030 | 39 | 2.7857 | 0.9286 |
| 3 | 99.12 | 23 | 64.5692 | 64 | 2.7826 | 0.9275 |
| 3 | 99.07 | 32 | 89.8354 | 89 | 2.7812 | 0.9271 |
| 3 | 98.95 | 27 | 75.7986 | 75 | 2.7778 | 0.9259 |
| 3 | 98.95 | 18 | 50.5324 | 50 | 2.7778 | 0.9259 |
| 3 | 98.95 | 9 | 25.2662 | 25 | 2.7778 | 0.9259 |
| 3 | 98.77 | 22 | 61.7618 | 61 | 2.7727 | 0.9242 |
| 3 | 98.64 | 26 | 72.9912 | 72 | 2.7692 | 0.9231 |
| 3 | 98.64 | 13 | 36.4956 | 36 | 2.7692 | 0.9231 |
| 3 | 98.48 | 17 | 47.7250 | 47 | 2.7647 | 0.9216 |
| 3 | 98.38 | 21 | 58.9545 | 58 | 2.7619 | 0.9206 |
| 3 | 97.96 | 16 | 44.9177 | 44 | 2.7500 | 0.9167 |
| 3 | 97.96 | 12 | 33.6883 | 33 | 2.7500 | 0.9167 |
| 3 | 97.96 | 8 | 22.4588 | 22 | 2.7500 | 0.9167 |
| 3 | 97.96 | 4 | 11.2294 | 11 | 2.7500 | 0.9167 |
| 3 | 97.15 | 11 | 30.8809 | 30 | 2.7273 | 0.9091 |
| 3 | 96.68 | 7 | 19.6515 | 19 | 2.7143 | 0.9048 |
| 3 | 94.99 | 6 | 16.8441 | 16 | 2.6667 | 0.8889 |
| 3 | 94.99 | 3 | 8.4221 | 8 | 2.6667 | 0.8889 |
| 3 | 89.05 | 2 | 5.6147 | 5 | 2.5000 | 0.8333 |
| 3 | 71.24 | 1 | 2.8074 | 2 | 2.0000 | 0.6667 |

T utilization: n=3, radix=6
(=2³-2, dumping 1 state)

| n | Utilization % | Symbol/group | bits/group | int(bpg) | bits/cycle | bits/wire |
|---|---|---|---|---|---|---|
| 3 | 99.94 | 24 | 62.0391 | 62 | 2.5833 | 0.8611 |
| 3 | 99.94 | 12 | 31.0196 | 31 | 2.5833 | 0.8611 |
| 3 | 99.83 | 31 | 80.1338 | 80 | 2.5806 | 0.8602 |
| 3 | 99.77 | 19 | 49.1143 | 49 | 2.5789 | 0.8596 |
| 3 | 99.69 | 26 | 67.2090 | 67 | 2.5769 | 0.8590 |
| 3 | 99.48 | 28 | 72.3790 | 72 | 2.5714 | 0.8571 |
| 3 | 99.48 | 21 | 54.2842 | 54 | 2.5714 | 0.8571 |
| 3 | 99.48 | 14 | 36.1895 | 36 | 2.5714 | 0.8571 |
| 3 | 99.48 | 7 | 18.0947 | 18 | 2.5714 | 0.8571 |
| 3 | 99.29 | 30 | 77.5489 | 77 | 2.5667 | 0.8556 |
| 3 | 99.24 | 23 | 59.4541 | 59 | 2.5652 | 0.8551 |
| 3 | 99.13 | 32 | 82.7188 | 82 | 2.5625 | 0.8542 |
| 3 | 99.13 | 16 | 41.3594 | 41 | 2.5625 | 0.8542 |
| 3 | 99.03 | 25 | 64.6241 | 64 | 2.5600 | 0.8533 |
| 3 | 98.86 | 27 | 69.7940 | 69 | 2.5556 | 0.8519 |
| 3 | 98.86 | 18 | 46.5293 | 46 | 2.5556 | 0.8519 |
| 3 | 98.86 | 9 | 23.2647 | 23 | 2.5556 | 0.8519 |
| 3 | 98.71 | 29 | 74.9639 | 74 | 2.5517 | 0.8506 |
| 3 | 98.65 | 20 | 51.6993 | 51 | 2.5500 | 0.8500 |
| 3 | 98.47 | 22 | 56.8692 | 56 | 2.5455 | 0.8485 |
| 3 | 98.47 | 11 | 28.4346 | 28 | 2.5455 | 0.8485 |
| 3 | 98.20 | 13 | 33.6045 | 33 | 2.5385 | 0.8462 |
| 3 | 98.00 | 15 | 38.7744 | 38 | 2.5333 | 0.8444 |
| 3 | 97.85 | 17 | 43.9444 | 43 | 2.5294 | 0.8431 |
| 3 | 96.71 | 10 | 25.8496 | 25 | 2.5000 | 0.8333 |
| 3 | 96.71 | 8 | 20.6797 | 20 | 2.5000 | 0.8333 |
| 3 | 96.71 | 6 | 15.5098 | 15 | 2.5000 | 0.8333 |
| 3 | 96.71 | 4 | 10.3399 | 10 | 2.5000 | 0.8333 |
| 3 | 96.71 | 2 | 5.1699 | 5 | 2.5000 | 0.8333 |
| 3 | 92.84 | 5 | 12.9248 | 12 | 2.4000 | 0.8000 |
| 3 | 90.27 | 3 | 7.7549 | 7 | 2.3333 | 0.7778 |
| 3 | 77.37 | 1 | 2.5850 | 2 | 2.0000 | 0.6667 |

T utilization: n=4, radix=15 (=$2^4$-1)

| n | Utilization % | Symbol/group | bits/group | int(bpg) | bits/cycle | bits/wire |
|---|---|---|---|---|---|---|
| 4 | 99.98 | 32 | 125.0205 | 125 | 3.9062 | 0.9766 |
| 4 | 99.95 | 21 | 82.0447 | 82 | 3.9048 | 0.9762 |
| 4 | 99.91 | 31 | 121.1136 | 121 | 3.9032 | 0.9758 |
| 4 | 99.82 | 30 | 117.2067 | 117 | 3.9000 | 0.9750 |
| 4 | 99.82 | 20 | 78.1378 | 78 | 3.9000 | 0.9750 |
| 4 | 99.82 | 10 | 39.0689 | 39 | 3.9000 | 0.9750 |
| 4 | 99.74 | 29 | 113.2998 | 113 | 3.8966 | 0.9741 |
| 4 | 99.69 | 19 | 74.2309 | 74 | 3.8947 | 0.9737 |
| 4 | 99.64 | 28 | 109.3929 | 109 | 3.8929 | 0.9732 |
| 4 | 99.54 | 27 | 105.4860 | 105 | 3.8889 | 0.9722 |
| 4 | 99.54 | 18 | 70.3240 | 70 | 3.8889 | 0.9722 |
| 4 | 99.54 | 9 | 35.1620 | 35 | 3.8889 | 0.9722 |
| 4 | 99.43 | 26 | 101.5792 | 101 | 3.8846 | 0.9712 |
| 4 | 99.37 | 17 | 66.4171 | 66 | 3.8824 | 0.9706 |
| 4 | 99.31 | 25 | 97.6723 | 97 | 3.8800 | 0.9700 |
| 4 | 99.18 | 24 | 93.7654 | 93 | 3.8750 | 0.9688 |
| 4 | 99.18 | 16 | 62.5102 | 62 | 3.8750 | 0.9688 |
| 4 | 99.18 | 8 | 31.2551 | 31 | 3.8750 | 0.9688 |
| 4 | 99.04 | 23 | 89.8585 | 89 | 3.8696 | 0.9674 |
| 4 | 98.97 | 15 | 58.6034 | 58 | 3.8667 | 0.9667 |
| 4 | 98.89 | 22 | 85.9516 | 85 | 3.8636 | 0.9659 |
| 4 | 98.73 | 14 | 54.6965 | 54 | 3.8571 | 0.9643 |
| 4 | 98.73 | 7 | 27.3482 | 27 | 3.8571 | 0.9643 |
| 4 | 98.45 | 13 | 50.7896 | 50 | 3.8462 | 0.9615 |
| 4 | 98.12 | 12 | 46.8827 | 46 | 3.8333 | 0.9583 |
| 4 | 98.12 | 6 | 23.4413 | 23 | 3.8333 | 0.9583 |
| 4 | 97.73 | 11 | 42.9758 | 42 | 3.8182 | 0.9545 |
| 4 | 97.26 | 5 | 19.5345 | 19 | 3.8000 | 0.9500 |
| 4 | 95.98 | 4 | 15.6276 | 15 | 3.7500 | 0.9375 |
| 4 | 93.85 | 3 | 11.7207 | 11 | 3.6667 | 0.9167 |
| 4 | 89.59 | 2 | 7.8138 | 7 | 3.5000 | 0.8750 |
| 4 | 76.79 | 1 | 3.9069 | 3 | 3.0000 | 0.7500 |

T utilization: n=4, radix=14
(=2⁴-2, dumping 1 state)

| n | Utilization % | Symbol/group | bits/group | int(bpg) | bits/cycle | bits/wire |
|---|---|---|---|---|---|---|
| 4 | 99.98 | 31 | 118.0280 | 118 | 3.8065 | 0.9516 |
| 4 | 99.81 | 30 | 114.2206 | 114 | 3.8000 | 0.9500 |
| 4 | 99.81 | 25 | 95.1839 | 95 | 3.8000 | 0.9500 |
| 4 | 99.81 | 20 | 76.1471 | 76 | 3.8000 | 0.9500 |
| 4 | 99.81 | 15 | 57.1103 | 57 | 3.8000 | 0.9500 |
| 4 | 99.81 | 10 | 38.0735 | 38 | 3.8000 | 0.9500 |
| 4 | 99.81 | 5 | 19.0368 | 19 | 3.8000 | 0.9500 |
| 4 | 99.63 | 29 | 110.4133 | 110 | 3.7931 | 0.9483 |
| 4 | 99.59 | 24 | 91.3765 | 91 | 3.7917 | 0.9479 |
| 4 | 99.53 | 19 | 72.3397 | 72 | 3.7895 | 0.9474 |
| 4 | 99.43 | 28 | 106.6059 | 106 | 3.7857 | 0.9464 |
| 4 | 99.43 | 14 | 53.3030 | 53 | 3.7857 | 0.9464 |
| 4 | 99.35 | 23 | 87.5692 | 87 | 3.7826 | 0.9457 |
| 4 | 99.31 | 32 | 121.8354 | 121 | 3.7812 | 0.9453 |
| 4 | 99.22 | 27 | 102.7986 | 102 | 3.7778 | 0.9444 |
| 4 | 99.22 | 18 | 68.5324 | 68 | 3.7778 | 0.9444 |
| 4 | 99.22 | 9 | 34.2662 | 34 | 3.7778 | 0.9444 |
| 4 | 99.08 | 22 | 83.7618 | 83 | 3.7727 | 0.9432 |
| 4 | 99.00 | 26 | 98.9912 | 98 | 3.7692 | 0.9423 |
| 4 | 99.00 | 13 | 49.4956 | 49 | 3.7692 | 0.9423 |
| 4 | 98.88 | 17 | 64.7250 | 64 | 3.7647 | 0.9412 |
| 4 | 98.81 | 21 | 79.9545 | 79 | 3.7619 | 0.9405 |
| 4 | 98.49 | 16 | 60.9177 | 60 | 3.7500 | 0.9375 |
| 4 | 98.49 | 12 | 45.6883 | 45 | 3.7500 | 0.9375 |
| 4 | 98.49 | 8 | 30.4588 | 30 | 3.7500 | 0.9375 |
| 4 | 98.49 | 4 | 15.2294 | 15 | 3.7500 | 0.9375 |
| 4 | 97.90 | 11 | 41.8809 | 41 | 3.7273 | 0.9318 |
| 4 | 97.56 | 7 | 26.6515 | 26 | 3.7143 | 0.9286 |
| 4 | 96.30 | 6 | 22.8441 | 22 | 3.6667 | 0.9167 |
| 4 | 96.30 | 3 | 11.4221 | 11 | 3.6667 | 0.9167 |
| 4 | 91.93 | 2 | 7.6147 | 7 | 3.5000 | 0.8750 |
| 4 | 78.79 | 1 | 3.8074 | 3 | 3.0000 | 0.7500 |

T utilization: n=5, radix=31 (=2^5-1)

| n | Utilization % | Symbol/group | bits/group | int(bpg) | bits/cycle | bits/wire |
|---|---|---|---|---|---|---|
| 5 | 99.96 | 21 | 104.0381 | 104 | 4.9524 | 0.9905 |
| 5 | 99.92 | 20 | 99.0839 | 99 | 4.9500 | 0.9900 |
| 5 | 99.86 | 19 | 94.1297 | 94 | 4.9474 | 0.9895 |
| 5 | 99.80 | 18 | 89.1755 | 89 | 4.9444 | 0.9889 |
| 5 | 99.74 | 17 | 84.2213 | 84 | 4.9412 | 0.9882 |
| 5 | 99.66 | 32 | 158.5343 | 158 | 4.9375 | 0.9875 |
| 5 | 99.66 | 16 | 79.2671 | 79 | 4.9375 | 0.9875 |
| 5 | 99.62 | 31 | 153.5801 | 153 | 4.9355 | 0.9871 |
| 5 | 99.58 | 30 | 148.6259 | 148 | 4.9333 | 0.9867 |
| 5 | 99.58 | 15 | 74.3129 | 74 | 4.9333 | 0.9867 |
| 5 | 99.53 | 29 | 143.6717 | 143 | 4.9310 | 0.9862 |
| 5 | 99.48 | 28 | 138.7175 | 138 | 4.9286 | 0.9857 |
| 5 | 99.48 | 14 | 69.3587 | 69 | 4.9286 | 0.9857 |
| 5 | 99.43 | 27 | 133.7633 | 133 | 4.9259 | 0.9852 |
| 5 | 99.37 | 26 | 128.8091 | 128 | 4.9231 | 0.9846 |
| 5 | 99.37 | 13 | 64.4046 | 64 | 4.9231 | 0.9846 |
| 5 | 99.31 | 25 | 123.8549 | 123 | 4.9200 | 0.9840 |
| 5 | 99.24 | 24 | 118.9007 | 118 | 4.9167 | 0.9833 |
| 5 | 99.24 | 12 | 59.4504 | 59 | 4.9167 | 0.9833 |
| 5 | 99.17 | 23 | 113.9465 | 113 | 4.9130 | 0.9826 |
| 5 | 99.09 | 22 | 108.9923 | 108 | 4.9091 | 0.9818 |
| 5 | 99.09 | 11 | 54.4962 | 54 | 4.9091 | 0.9818 |
| 5 | 98.91 | 10 | 49.5420 | 49 | 4.9000 | 0.9800 |
| 5 | 98.68 | 9 | 44.5878 | 44 | 4.8889 | 0.9778 |
| 5 | 98.40 | 8 | 39.6336 | 39 | 4.8750 | 0.9750 |
| 5 | 98.04 | 7 | 34.6794 | 34 | 4.8571 | 0.9714 |
| 5 | 97.56 | 6 | 29.7252 | 29 | 4.8333 | 0.9667 |
| 5 | 96.89 | 5 | 24.7710 | 24 | 4.8000 | 0.9600 |
| 5 | 95.88 | 4 | 19.8168 | 19 | 4.7500 | 0.9500 |
| 5 | 94.20 | 3 | 14.8626 | 14 | 4.6667 | 0.9333 |
| 5 | 90.83 | 2 | 9.9084 | 9 | 4.5000 | 0.9000 |
| 5 | 80.74 | 1 | 4.9542 | 4 | 4.0000 | 0.8000 |

T utilization: n=5, radix=30
($=2^5-2$, dumping 1 state)

| n | Utilization % | Symbol/group | bits/group | int(bpg) | bits/cycle | bits/wire |
|---|---|---|---|---|---|---|
| 5 | 99.99 | 32 | 157.0205 | 157 | 4.9062 | 0.9812 |
| 5 | 99.96 | 21 | 103.0447 | 103 | 4.9048 | 0.9810 |
| 5 | 99.93 | 31 | 152.1136 | 152 | 4.9032 | 0.9806 |
| 5 | 99.86 | 30 | 147.2067 | 147 | 4.9000 | 0.9800 |
| 5 | 99.86 | 20 | 98.1378 | 98 | 4.9000 | 0.9800 |
| 5 | 99.86 | 10 | 49.0689 | 49 | 4.9000 | 0.9800 |
| 5 | 99.79 | 29 | 142.2998 | 142 | 4.8966 | 0.9793 |
| 5 | 99.75 | 19 | 93.2309 | 93 | 4.8947 | 0.9789 |
| 5 | 99.71 | 28 | 137.3929 | 137 | 4.8929 | 0.9786 |
| 5 | 99.63 | 27 | 132.4860 | 132 | 4.8889 | 0.9778 |
| 5 | 99.63 | 18 | 88.3240 | 88 | 4.8889 | 0.9778 |
| 5 | 99.63 | 9 | 44.1620 | 44 | 4.8889 | 0.9778 |
| 5 | 99.55 | 26 | 127.5792 | 127 | 4.8846 | 0.9769 |
| 5 | 99.50 | 17 | 83.4171 | 83 | 4.8824 | 0.9765 |
| 5 | 99.45 | 25 | 122.6723 | 122 | 4.8800 | 0.9760 |
| 5 | 99.35 | 24 | 117.7654 | 117 | 4.8750 | 0.9750 |
| 5 | 99.35 | 16 | 78.5102 | 78 | 4.8750 | 0.9750 |
| 5 | 99.35 | 8 | 39.2551 | 39 | 4.8750 | 0.9750 |
| 5 | 99.24 | 23 | 112.8585 | 112 | 4.8696 | 0.9739 |
| 5 | 99.18 | 15 | 73.6034 | 73 | 4.8667 | 0.9733 |
| 5 | 99.12 | 22 | 107.9516 | 107 | 4.8636 | 0.9727 |
| 5 | 98.99 | 14 | 68.6965 | 68 | 4.8571 | 0.9714 |
| 5 | 98.99 | 7 | 34.3482 | 34 | 4.8571 | 0.9714 |
| 5 | 98.76 | 13 | 63.7896 | 63 | 4.8462 | 0.9692 |
| 5 | 98.50 | 12 | 58.8827 | 58 | 4.8333 | 0.9667 |
| 5 | 98.50 | 6 | 29.4413 | 29 | 4.8333 | 0.9667 |
| 5 | 98.19 | 11 | 53.9758 | 53 | 4.8182 | 0.9636 |
| 5 | 97.82 | 5 | 24.5345 | 24 | 4.8000 | 0.9600 |
| 5 | 96.80 | 4 | 19.6276 | 19 | 4.7500 | 0.9500 |
| 5 | 95.10 | 3 | 14.7207 | 14 | 4.6667 | 0.9333 |
| 5 | 91.71 | 2 | 9.8138 | 9 | 4.5000 | 0.9000 |
| 5 | 81.52 | 1 | 4.9069 | 4 | 4.0000 | 0.8000 |

*FIG. 19*

T utilization: n=8, radix=255 (=$2^8$-1)

| n | Utilization % | Symbol/group | bits/group | int(bpg) | bits/cycle | bits/wire |
|---|---|---|---|---|---|---|
| 8 | 99.68 | 32 | 255.8193 | 255 | 7.9688 | 0.9961 |
| 8 | 99.67 | 31 | 247.8250 | 247 | 7.9677 | 0.9960 |
| 8 | 99.65 | 30 | 239.8306 | 239 | 7.9667 | 0.9958 |
| 8 | 99.64 | 29 | 231.8362 | 231 | 7.9655 | 0.9957 |
| 8 | 99.62 | 28 | 223.8419 | 223 | 7.9643 | 0.9955 |
| 8 | 99.61 | 27 | 215.8475 | 215 | 7.9630 | 0.9954 |
| 8 | 99.59 | 26 | 207.8532 | 207 | 7.9615 | 0.9952 |
| 8 | 99.57 | 25 | 199.8588 | 199 | 7.9600 | 0.9950 |
| 8 | 99.55 | 24 | 191.8645 | 191 | 7.9583 | 0.9948 |
| 8 | 99.53 | 23 | 183.8701 | 183 | 7.9565 | 0.9946 |
| 8 | 99.50 | 22 | 175.8758 | 175 | 7.9545 | 0.9943 |
| 8 | 99.47 | 21 | 167.8814 | 167 | 7.9524 | 0.9940 |
| 8 | 99.45 | 20 | 159.8871 | 159 | 7.9500 | 0.9938 |
| 8 | 99.41 | 19 | 151.8927 | 151 | 7.9474 | 0.9934 |
| 8 | 99.38 | 18 | 143.8984 | 143 | 7.9444 | 0.9931 |
| 8 | 99.33 | 17 | 135.9040 | 135 | 7.9412 | 0.9926 |
| 8 | 99.29 | 16 | 127.9097 | 127 | 7.9375 | 0.9922 |
| 8 | 99.24 | 15 | 119.9153 | 119 | 7.9333 | 0.9917 |
| 8 | 99.18 | 14 | 111.9209 | 111 | 7.9286 | 0.9911 |
| 8 | 99.11 | 13 | 103.9266 | 103 | 7.9231 | 0.9904 |
| 8 | 99.03 | 12 | 95.9322 | 95 | 7.9167 | 0.9896 |
| 8 | 98.93 | 11 | 87.9379 | 87 | 7.9091 | 0.9886 |
| 8 | 98.82 | 10 | 79.9435 | 79 | 7.9000 | 0.9875 |
| 8 | 98.68 | 9 | 71.9492 | 71 | 7.8889 | 0.9861 |
| 8 | 98.51 | 8 | 63.9548 | 63 | 7.8750 | 0.9844 |
| 8 | 98.28 | 7 | 55.9605 | 55 | 7.8571 | 0.9821 |
| 8 | 97.99 | 6 | 47.9661 | 47 | 7.8333 | 0.9792 |
| 8 | 97.57 | 5 | 39.9718 | 39 | 7.8000 | 0.9750 |
| 8 | 96.94 | 4 | 31.9774 | 31 | 7.7500 | 0.9688 |
| 8 | 95.90 | 3 | 23.9831 | 23 | 7.6667 | 0.9583 |
| 8 | 93.82 | 2 | 15.9887 | 15 | 7.5000 | 0.9375 |
| 8 | 87.56 | 1 | 7.9944 | 7 | 7.0000 | 0.8750 |

T utilization: n=8, radix=254
($=2^8-2$, dumping 1 state)

| n | Utilization % | Symbol/group | bits/group | int bpg | bits/cycle | bits/wire |
|---|---|---|---|---|---|---|
| 8 | 99.75 | 32 | 255.6379 | 255 | 7.9688 | 0.9961 |
| 8 | 99.74 | 31 | 247.6492 | 247 | 7.9677 | 0.9960 |
| 8 | 99.72 | 30 | 239.6605 | 239 | 7.9667 | 0.9958 |
| 8 | 99.71 | 29 | 231.6719 | 231 | 7.9655 | 0.9957 |
| 8 | 99.69 | 28 | 223.6832 | 223 | 7.9643 | 0.9955 |
| 8 | 99.68 | 27 | 215.6945 | 215 | 7.9630 | 0.9954 |
| 8 | 99.66 | 26 | 207.7058 | 207 | 7.9615 | 0.9952 |
| 8 | 99.64 | 25 | 199.7171 | 199 | 7.9600 | 0.9950 |
| 8 | 99.62 | 24 | 191.7284 | 191 | 7.9583 | 0.9948 |
| 8 | 99.60 | 23 | 183.7397 | 183 | 7.9565 | 0.9946 |
| 8 | 99.57 | 22 | 175.7511 | 175 | 7.9545 | 0.9943 |
| 8 | 99.55 | 21 | 167.7624 | 167 | 7.9524 | 0.9940 |
| 8 | 99.52 | 20 | 159.7737 | 159 | 7.9500 | 0.9938 |
| 8 | 99.48 | 19 | 151.7850 | 151 | 7.9474 | 0.9934 |
| 8 | 99.45 | 18 | 143.7963 | 143 | 7.9444 | 0.9931 |
| 8 | 99.41 | 17 | 135.8076 | 135 | 7.9412 | 0.9926 |
| 8 | 99.36 | 16 | 127.8190 | 127 | 7.9375 | 0.9922 |
| 8 | 99.31 | 15 | 119.8303 | 119 | 7.9333 | 0.9917 |
| 8 | 99.25 | 14 | 111.8416 | 111 | 7.9286 | 0.9911 |
| 8 | 99.18 | 13 | 103.8529 | 103 | 7.9231 | 0.9904 |
| 8 | 99.10 | 12 | 95.8642 | 95 | 7.9167 | 0.9896 |
| 8 | 99.00 | 11 | 87.8755 | 87 | 7.9091 | 0.9886 |
| 8 | 98.89 | 10 | 79.8868 | 79 | 7.9000 | 0.9875 |
| 8 | 98.75 | 9 | 71.8982 | 71 | 7.8889 | 0.9861 |
| 8 | 98.58 | 8 | 63.9095 | 63 | 7.8750 | 0.9844 |
| 8 | 98.35 | 7 | 55.9208 | 55 | 7.8571 | 0.9821 |
| 8 | 98.05 | 6 | 47.9321 | 47 | 7.8333 | 0.9792 |
| 8 | 97.64 | 5 | 39.9434 | 39 | 7.8000 | 0.9750 |
| 8 | 97.01 | 4 | 31.9547 | 31 | 7.7500 | 0.9688 |
| 8 | 95.97 | 3 | 23.9661 | 23 | 7.6667 | 0.9583 |
| 8 | 93.88 | 2 | 15.9774 | 15 | 7.5000 | 0.9375 |
| 8 | 87.62 | 1 | 7.9887 | 7 | 7.0000 | 0.8750 |

*FIG. 21*

MULTI-WIRE SINGLE-ENDED PUSH-PULL LINK WITH DATA SYMBOL TRANSITION BASED CLOCKING

CROSS-REFERENCE TO RELATED APPLICATIONS

This application is a division of U.S. patent application Ser. No. 14/205,242 filed in the U.S. patent office on Mar. 11, 2014, which claims priority to and the benefit of provisional patent application No. 61/793,955 filed in the U.S. patent office on Mar. 15, 2013, the entire content of these applications being incorporated herein by reference.

BACKGROUND

1. Field

The present disclosure pertains to transmitting and/or encoding a clock signal within cycles of a multi-signal data transfer.

2. Background

Various standards have been promulgated for data transfer. In one example, the Mobile Industry Processor Interface (MIPI®) Alliance has defined a High-speed Synchronous Serial Interface (HSI) Specification, MIPI DPHY Low Power (LP) signaling for use in single-ended signaling that employs, for example, a synchronous complementary metal-oxide-semiconductor (CMOS) (push-pull) communication interface. Data transfer schemes often use a dedicated clock or strobe signal line to send cycle timing information from a transmitter device to a receiver device.

The use of a dedicated clock or strobe signal line requires using at least one additional conductor. For single-rate signaling applications, one data symbol per one full clock period (clock high and clock low) is sent. The maximum data rate is often limited by a maximum allowed frequency of the clock line of the system rather than maximum allowed frequency of the data line. The maximum data rate is also often limited by skew between clock and data that may be hard to control to be optimal.

Therefore, an efficient way to embed a clock signal within a multi-wire single-ended signaling system is needed.

SUMMARY

Embodiments disclosed herein provide systems, methods and apparatus related to multi-wire interfaces exchange clock information in a sequence of symbols transmitted over a plurality of wires.

In an aspect of the disclosure, a method of multi-wire signaling includes converting a sequence of data bits into a plurality of M transition numbers, converting the M transition numbers into a sequence of symbols, and transmitting the sequence of symbols over N wires using N single-ended drivers. A clock signal may be effectively embedded in the transmission of the sequence of symbols. Each of the sequence of symbols may be selected based on a corresponding one of the M transition numbers and a value of a preceding one of the sequence of symbols.

In another aspect, the conversion from the M transition numbers into a sequence of symbols guarantees that no two sequentially occurring symbols in the sequence of symbols are the same.

In another aspect, converting the M transition numbers into a sequence of symbols includes (for each of the M transition numbers) determining an immediate predecessor symbol in the sequence of symbols, and selecting as a next symbol in the sequence of symbols, a symbol identified by using the each transition number as an offset from the immediate predecessor symbol.

In another aspect, each symbol in the sequence of symbols is selected from a plurality of available symbols. Each of the plurality of available symbols may correspond to a signaling state of the N wires that is different from the signaling states that correspond to the other symbols in the plurality of available symbols. Each of the sequence of symbols may be associated with a number R of possible symbol transition states for each transition number. The sequence of symbols may be associated with a number R of possible signaling states associated with each symbol in the plurality of available symbols. The sequence of symbols may provide $R^M$ different states. The $R^M$ different states may determine a number of bits that can be encoded in the sequence of symbols.

In an aspect of the disclosure, an apparatus includes means for converting a sequence of data bits into a plurality of M transition numbers, means for converting the M transition numbers into a sequence of symbols, and means for transmitting the sequence of symbols over N wires using N single-ended drivers. A clock signal may be effectively embedded in the sequence of symbols. Each of the sequence of symbols may be selected based on a corresponding one of the M transition numbers and a value of a preceding one of the sequence of symbols.

In an aspect of the disclosure, a transmitter includes a processing circuit configured to convert a sequence of data bits into a plurality of M transition numbers, convert the M transition numbers into a sequence of symbols, and transmit the sequence of symbols over N wires using N single-ended drivers. A clock signal may be effectively embedded in the sequence of symbols. Each of the sequence of symbols is selected based on a corresponding one of the M transition numbers and a value of a preceding one of the sequence of symbols.

In an aspect of the disclosure, a processor-readable storage medium has one or more instructions stored thereon. The instructions, when executed by at least one processing circuit, cause the at least one processing circuit to convert a sequence of data bits into a plurality of M transition numbers, convert the M transition numbers into a sequence of symbols, and transmit the sequence of symbols over N wires using N single-ended drivers. A clock signal may be effectively embedded in the transmission of the sequence of symbols. Each of the sequence of symbols may be selected based on a corresponding one of the M transition numbers and a value of a preceding one of the sequence of symbols.

In an aspect of the disclosure, a method for performing multi-wire signaling decoding includes receiving a sequence of symbols from a plurality of N wires using N receivers, extracting a clock signal from the sequence of symbols, converting the sequence of symbols to M transition numbers using the clock signal, and converting the plurality of transition numbers into data bits. The clock signal may be extracted from clock information encoded in transitions between pairs of consecutive symbols in the sequence of symbols.

In another aspect, each pair of consecutive symbols in the sequence of symbols may include two different symbols.

In another aspect, converting the sequence of symbols to the M transition numbers includes using the clock to identify a transition in signaling state of the N wires, and calculating a transition number based on a difference in a first symbol associated with a signaling state occurring before the identified transition and a second symbol associated with a signaling state occurring after the identified transition. Each possible signaling state of the N wires may correspond to a different one of a plurality of available symbols. The second symbol may correspond to one of a number R of possible signaling states.

In an aspect of the disclosure, an apparatus includes means for receiving a sequence of symbols from a plurality of N wires using N receivers, means for extracting a clock signal from the sequence of symbols, means for converting the sequence of symbols to M transition numbers using the clock signal, and means for converting the plurality of transition numbers into data bits. The clock signal may be extracted from clock information encoded in transitions between pairs of consecutive symbols in the sequence of symbols.

In an aspect of the disclosure, a receiver includes a processing circuit configured to receive a sequence of symbols from a plurality of N wires using N receivers, extract a clock signal from the reception of the sequence of symbols, convert the sequence of symbols to M transition numbers using the clock signal, and convert the plurality of transition numbers into data bits. The clock signal may be extracted from clock information encoded in transitions between pairs of consecutive symbols in the sequence of symbols.

In an aspect of the disclosure, a processor-readable storage medium has one or more instructions stored thereon. The instructions, when executed by at least one processing circuit, cause the at least one processing circuit to receive a sequence of symbols from over a plurality of N wires using N receivers, extract a clock signal from the sequence of symbols, convert the sequence of symbols to M transition numbers using the clock signal, and convert the plurality of transition numbers into data bits. The clock signal may be extracted from clock information encoded in transitions between pairs of consecutive symbols in the sequence of symbols.

BRIEF DESCRIPTION OF THE DRAWINGS

Various features, nature and advantages may become apparent from the detailed description set forth below when taken in conjunction with the drawings in which like reference characters identify correspondingly throughout.

FIG. 13 illustrates a utilization table for a 2-wire system using all available 3-symbol transitions at various symbols per group.

FIG. 14 illustrates a utilization table for a 3-wire system using all available 7-symbol transitions at various symbols per group.

FIG. 15 illustrates a utilization table for a 3-wire system using all available 6-symbol transitions (by reserving 1 state for a special purpose) at various symbols per group.

FIG. 16 illustrates a utilization table for a 4-wire system using all available 15-symbol transitions at various symbols per group.

FIG. 17 illustrates a utilization table for a 4-wire system using all available 14-symbol transitions (by reserving 1 state for a special purpose) at various symbols per group.

FIG. 18 illustrates a utilization table for a 5-wire system using all available 31-symbol transitions at various symbols per group.

FIG. 19 illustrates a utilization table for a 5-wire system using all available 30-symbol transitions (by reserving 1 state for a special purpose) at various symbols per group.

FIG. 20 illustrates a utilization table for an 8-wire system using all available 255-symbol transitions at various symbols per group.

FIG. 21 illustrates a utilization table for an 8-wire system using all available 254-symbol transitions (by reserving 1 state for a special purpose) at various symbols per group.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. For example, circuits may be shown in block diagrams in order not to obscure the embodiments in unnecessary detail. In other instances, well-known circuits, structures and techniques may not be shown in detail in order not to obscure the embodiments.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
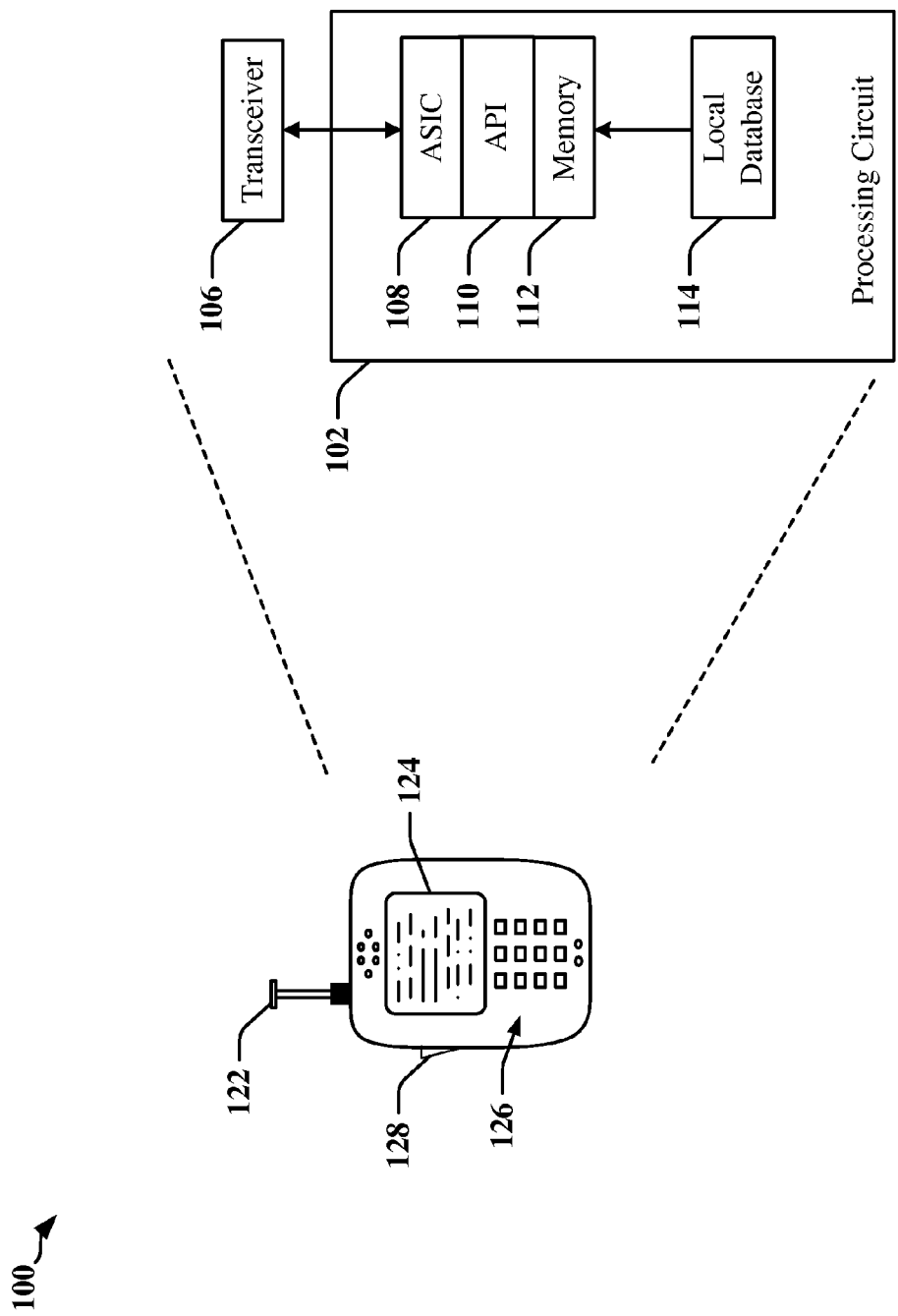
FIG. 1 depicts an apparatus employing a data link between IC devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, etc. FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as button 128 and keypad 126 among other components.

Figure 2:
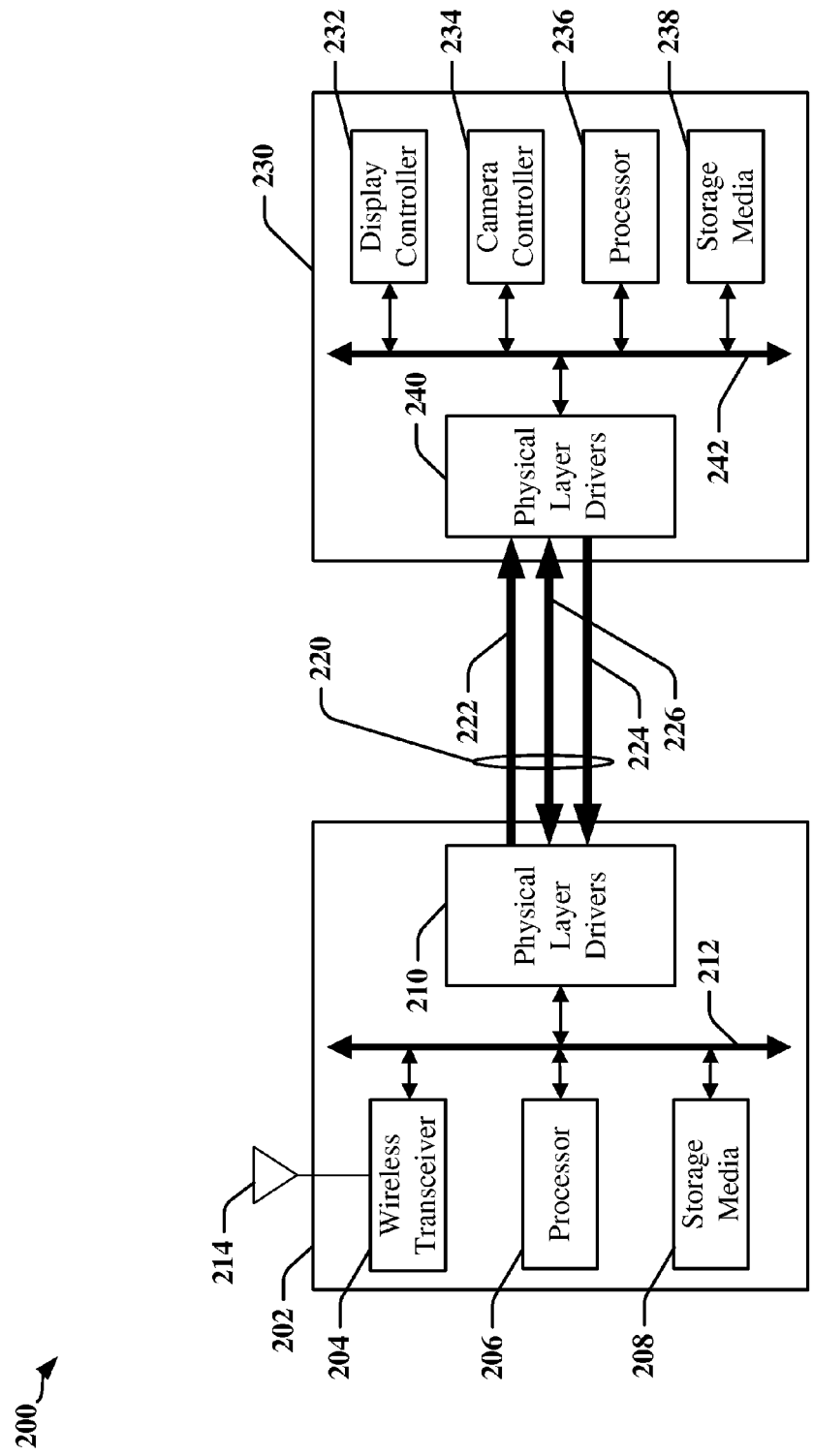
FIG. 2 illustrates a system architecture for an apparatus employing a data link between IC devices.

FIG. 2 is a block schematic diagram illustrating certain aspects of an apparatus 200 that employs a communication link 220, where the apparatus 200 may be embodied in one or more of a wireless mobile device, a mobile telephone, a mobile computing system, a wireless telephone, a notebook computer, a tablet computing device, a media player, a gaming device, or the like. The apparatus 200 may comprise a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may comprise a cable or optical connection.

The communication link 220 may include multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. The first IC device 202 or second IC device 230 may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

In one example, forward and reverse links 222 and 224 may be configured or adapted to support a wide video graphics array (WVGA) 80 frames per second LCD driver IC without a frame buffer, delivering pixel data at 810 Mbps for display refresh. In another example, forward and reverse links 222 and 224 may be configured or adapted to enable communications between with dynamic random access memory (DRAM), such as double data rate synchronous dynamic random access memory (SDRAM). Encoding devices 210 and/or 230 can encode multiple bits per clock transition, and multiple sets of wires can be used to transmit and receive data from the SDRAM, control signals, address signals, and so on.

The forward and reverse links 222 and 224 may comply or be compatible with application-specific industry standards. In one example, the MIPI standard defines physical layer interfaces between an application processor IC device 202 and an IC device 230 that supports the camera or display in a mobile device. The MIPI standard includes specifications that govern the operational characteristics of products that comply with MIPI specifications for mobile devices. The MIPI standard may define interfaces that employ complimentary metal-oxide-semiconductor (CMOS) parallel busses.

The communication link 220 of FIG. 2 may be implemented as a wired bus that includes a plurality of signal wires (denoted as N wires). The N wires may be configured to carry data encoded in symbols, where clock information is embedded in a sequence of the symbols transmitted over the plurality of wires.

Figure 3:
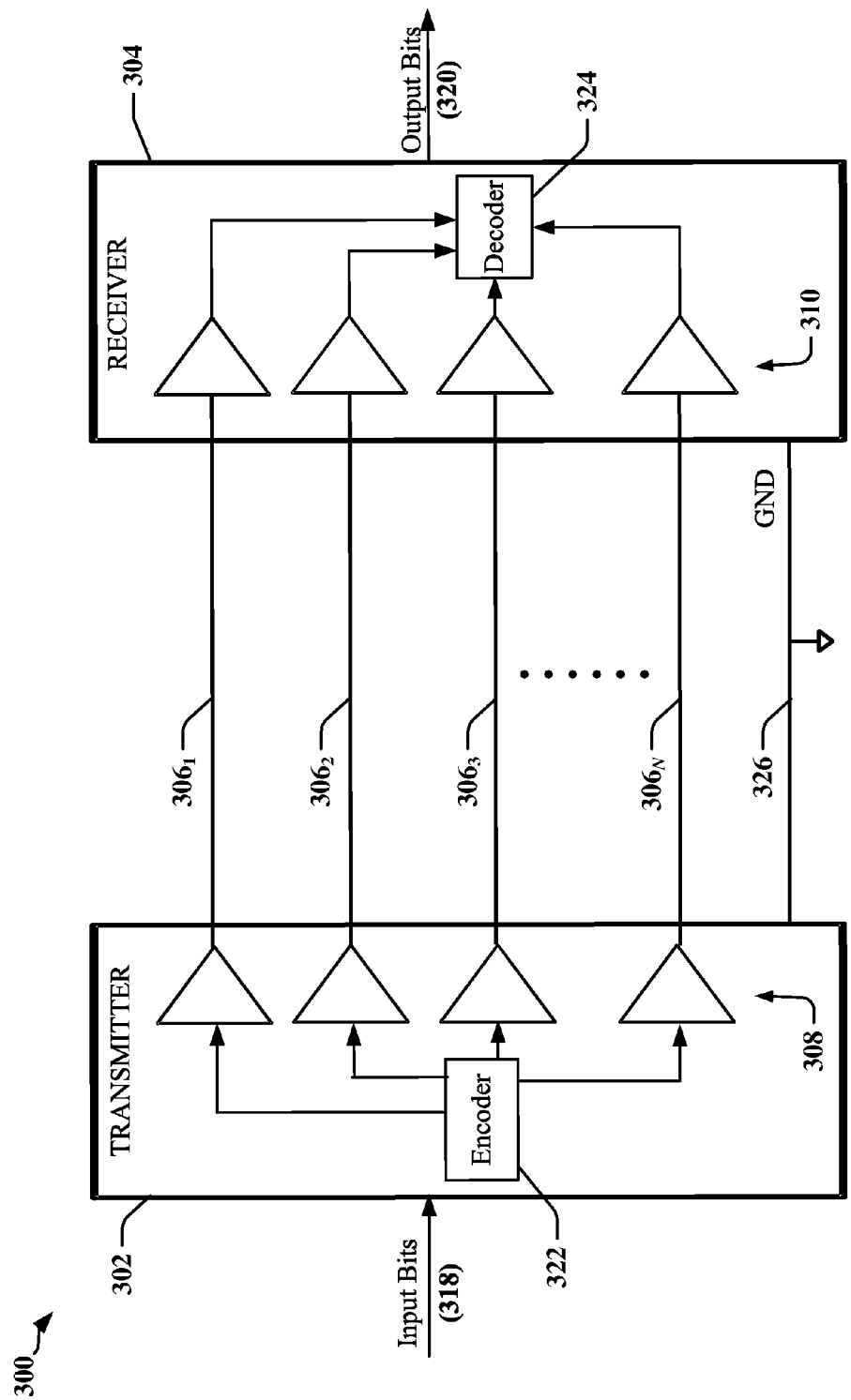
FIG. 3 illustrates a single-ended signaling system.

Certain aspects disclosed herein relate to a device and method for embedding a clock signal within multi-wire, single-ended systems. FIG. 3 is a block diagram 300 illustrating certain aspects of a multi-wire, single-ended, push-pull communication link that may be configured to use transition based clocking. The example depicts a communication link that can transmit data over N signal wires $306_1$-$306_N$.

In single-ended signaling, one wire/conductor $306_1$-$306_N$ carries a varying voltage that represents the signal, while another wire 326 may be connected to a reference voltage, such as a system ground voltage. A transmitting device 302 may include one or more single-ended push-pull CMOS drivers 308, each driver 308 coupled to a single wire/conductor $306_1$-$306_N$. A receiving device 304 may include one or more single-ended CMOS receivers 310, each single-ended receiver 310 coupled to a single wire/conductor $306_1$-$306_N$. The transmitting device 302 includes an encoder 322 that encodes input bits 318 received by the transmitting device 302. The encoder 322 encodes the input bits 318 into single-ended signals for transmission to the receiving device 304 in N single-ended signals through the single-ended drivers 308 over a corresponding N wires/conductors $306_1$-$306_N$. The receiving device 304 receives the single-ended signals from the N wires/conductors $306_1$-$306_N$ through the single-ended receivers 310. The receiving device 304 includes a decoder 324 that is configured to decode the N single-ended signals and to provide output bits 320. In this single-ended system, the decoder 324 may include a clock and data recovery (CDR) such that a clock signal is extracted from the N received single-ended signals.

Figure 4:
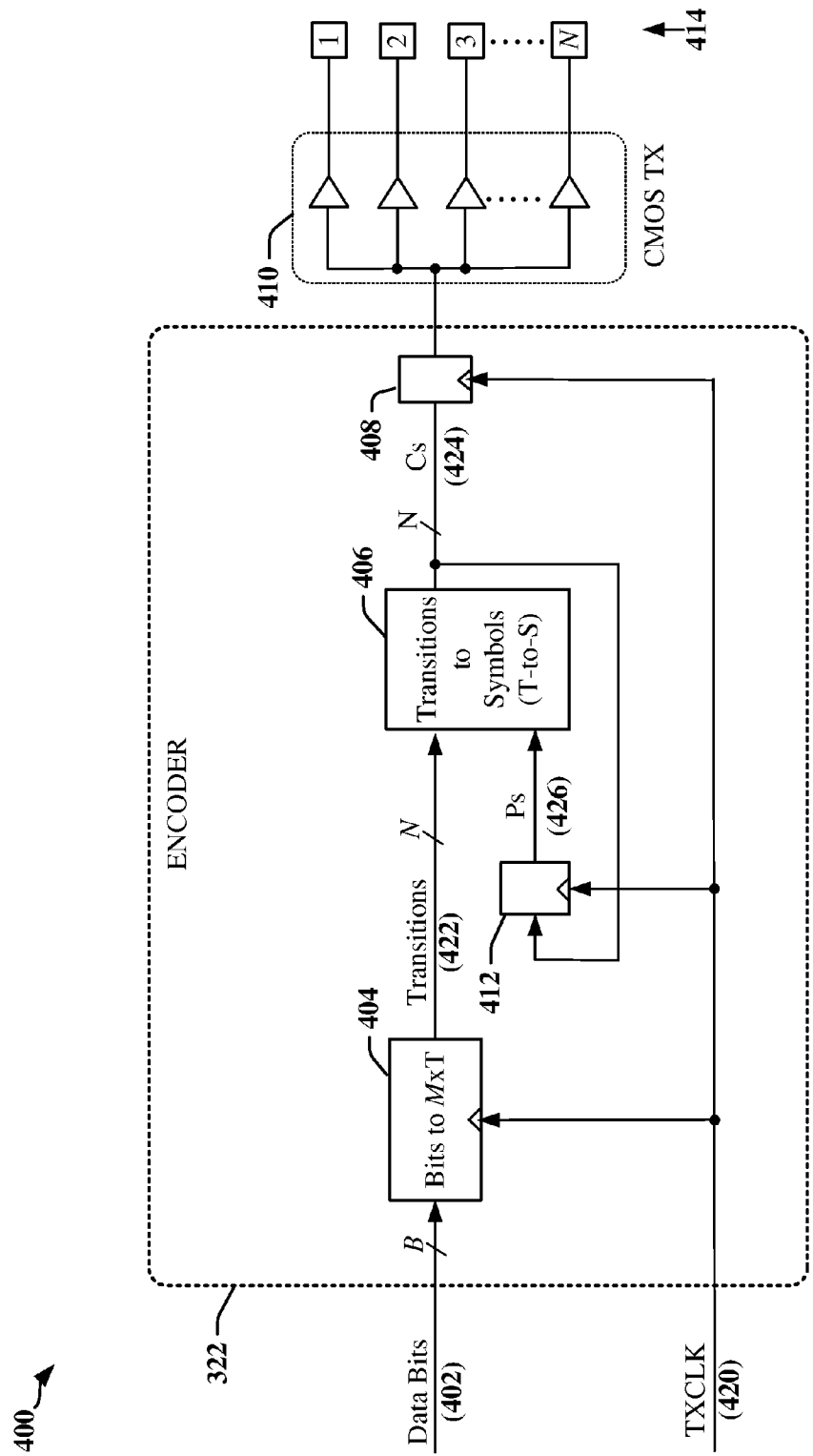
FIG. 4 is a block diagram illustrating an example of an encoder in a transmitting device.

FIG. 4 is a block diagram 400 illustrating certain aspects of the encoder 322 in the transmitting device 302 of FIG. 3.

The encoder 322 may include a first converter (Bits-to-M×T converter) 404 that converts binary formatted data bits 402 into M multiple transition numbers, {T0, T1, . . . , Tm−1} 422. A second converter (T-to-S converter) 406 then converts each transition number T 422 into a symbol number current state Cs 424. A first set of flip-flops 412, including N flip-flops for example, stores the current state Cs 424 at each symbol clock TXCLK 420, and provides a previous symbol Ps 426 to the T-to-S converter 406. A second set of flip-flops 408, including N flip-flops for example, samples the current state Cs 424 and provides output state data to a set of CMOS-type drivers 410, which are configured to drive the N wires 414. In some instances, the encoder may include one or both of the first set of flip-flops 412 and the second set of flip-flops 408, because logically the two sets of flip-flops 408, 412 receive the same Cs 424 as input and the two sets of flip-flops 408, 412 are clocked by TXCLK 420 and therefore produce the same logical output. The decision to provide one or two sets of flip-flops 408 and/or 412 may be based on design considerations including load, timing, layout and other parameters and characteristics.

Figure 5:
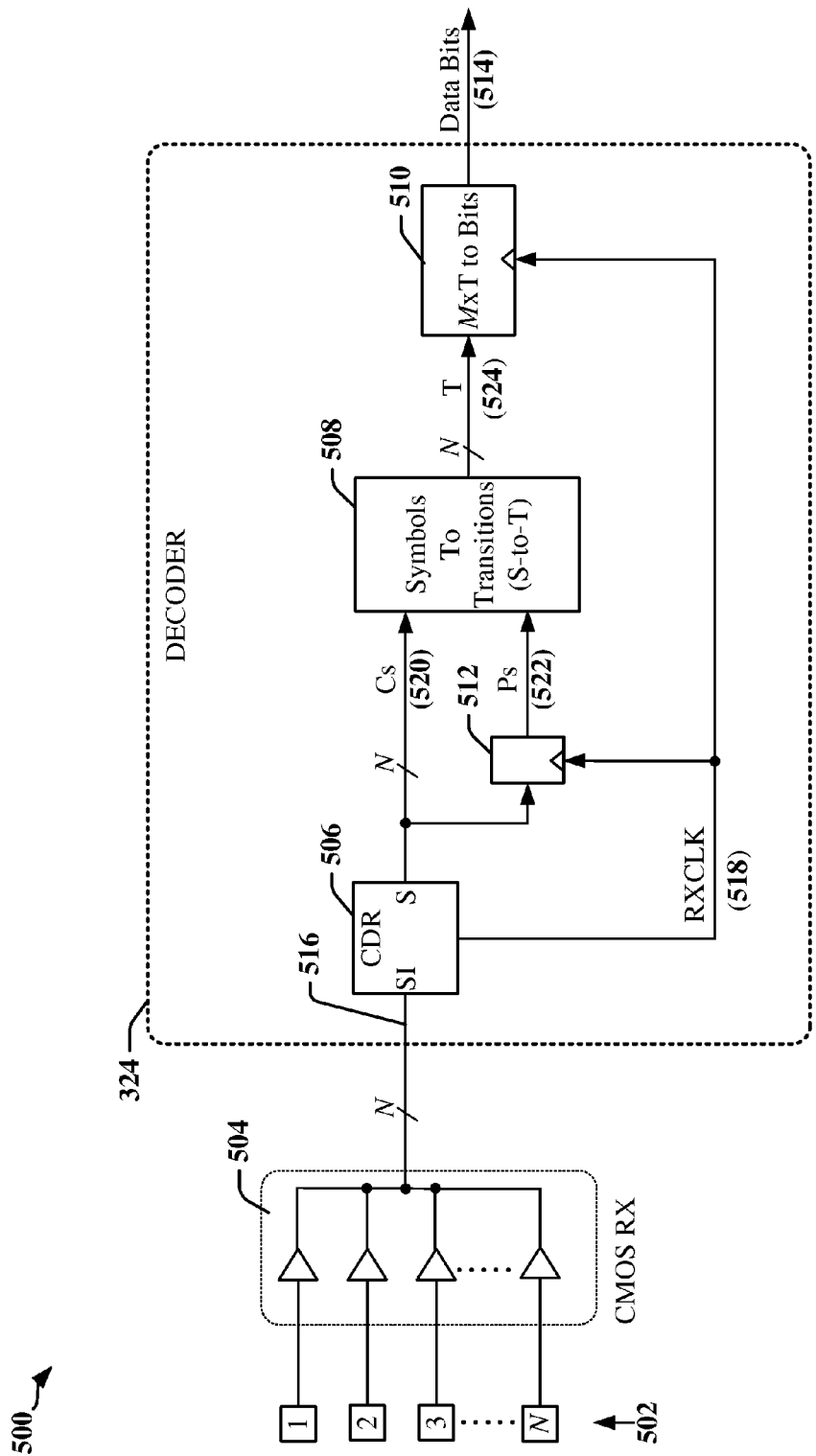
FIG. 5 is a block diagram illustrating a decoder in a receiving device.

FIG. 5 is a block diagram 500 illustrating certain aspects of the decoder 324 in the receiving device 304 of FIG. 3. A plurality of N CMOS-type single-ended receivers 504 serves to receive data on N-wire channels 502 as symbol input current state Cs 516. A clock and data recovery (CDR) circuit 506 is adapted to recover a symbol clock RXCLK 518 from the symbol input 516 from the receivers 504, and may be further adapted to register the valid symbol data to be used by the rest of the decoder 324. A plurality of N flip-flops 512 stores the current state Cs 520 at each rising edge of the clock RXCLK 518 and generates a previous state Ps 522 as its output. A first convertor (S-to-T converter) 508 generates a sequential transition number T 524 by comparing the current state Cs 520 and the previous state Ps 522. A second convertor (M×T-to-Bits) converter 510 converts M multiple transition numbers, {T0, T1, . . . , Tm−1} 524 into binary formatted data to be output as bits 514.

Figure 6:
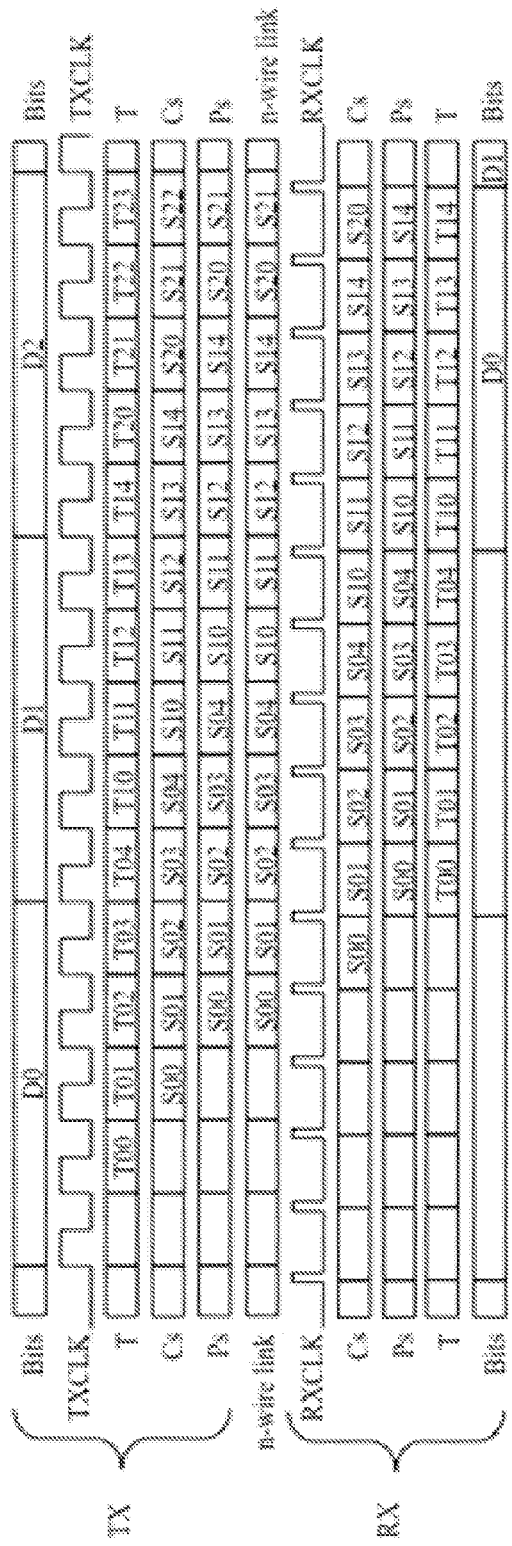
FIG. 6 illustrates a timing diagram of the transmitter and receiver devices of FIGS. 4 and 5.

FIG. 6 is a timing diagram 600 illustrating certain signal timing aspects associated with the transmitting device 302 and the receiving device 304 illustrated in FIGS. 4 and 5. At the encoder 322 of the transmitting device 302, original input data 402 in binary bits format includes a sequence of data $D_j$: {D0, D1, D2, . . . }. The input data 402 may be converted by the Bits-to-M×T converter 404 to a plurality of transition numbers, {$T_j0$, $T_j1$, $T_j1$, $T_j1$, $T_j4$ . . . } in the transition signal (T signal) 422, where j represents one of the sequences of data $D_j$. The conversion is performed by the by the Bits-to-M×T converter 404 at every rising edge of TXCLK 420. The signal T 422 is converted into the current state Cs signal 424 (e.g., {$S_j0$, $S_j1$, $S_j2$, $S_j3$, $S_j4$ . . . }) by the T-to-S converter 406. The current state Cs signal 424 is sampled at every rising edge of TXCLK 420, and the N CMOS push-pull drivers 410 output the sampled data to the N-wire communication link 414.

At the decoder 324 of the receiving device 304, the signal on the N-wire communication link 502 is received by the N CMOS receivers 504 whose output 516 is provided to the CDR circuit 506, which may be adapted to recover the link clock RXCLK 518, and to output valid current state data 520 at every rising edge of RXCLK 518. The current state data 520 may be provided to the S-to-T converter 508 for conversion each of the symbol states (e.g., {$S_j0$, $S_j1$, $S_j2$, $S_j3$, $S_j4$ . . . }) 520 into transition numbers (e.g., {$T_j0$, $T_j1$, $T_j2$, $T_j3$, $T_j4$ . . . }) 524. The transition numbers 524 may be provided to an M×T-to-Bits converter 510 to restore the binary encoded bits 514.

Figure 7:
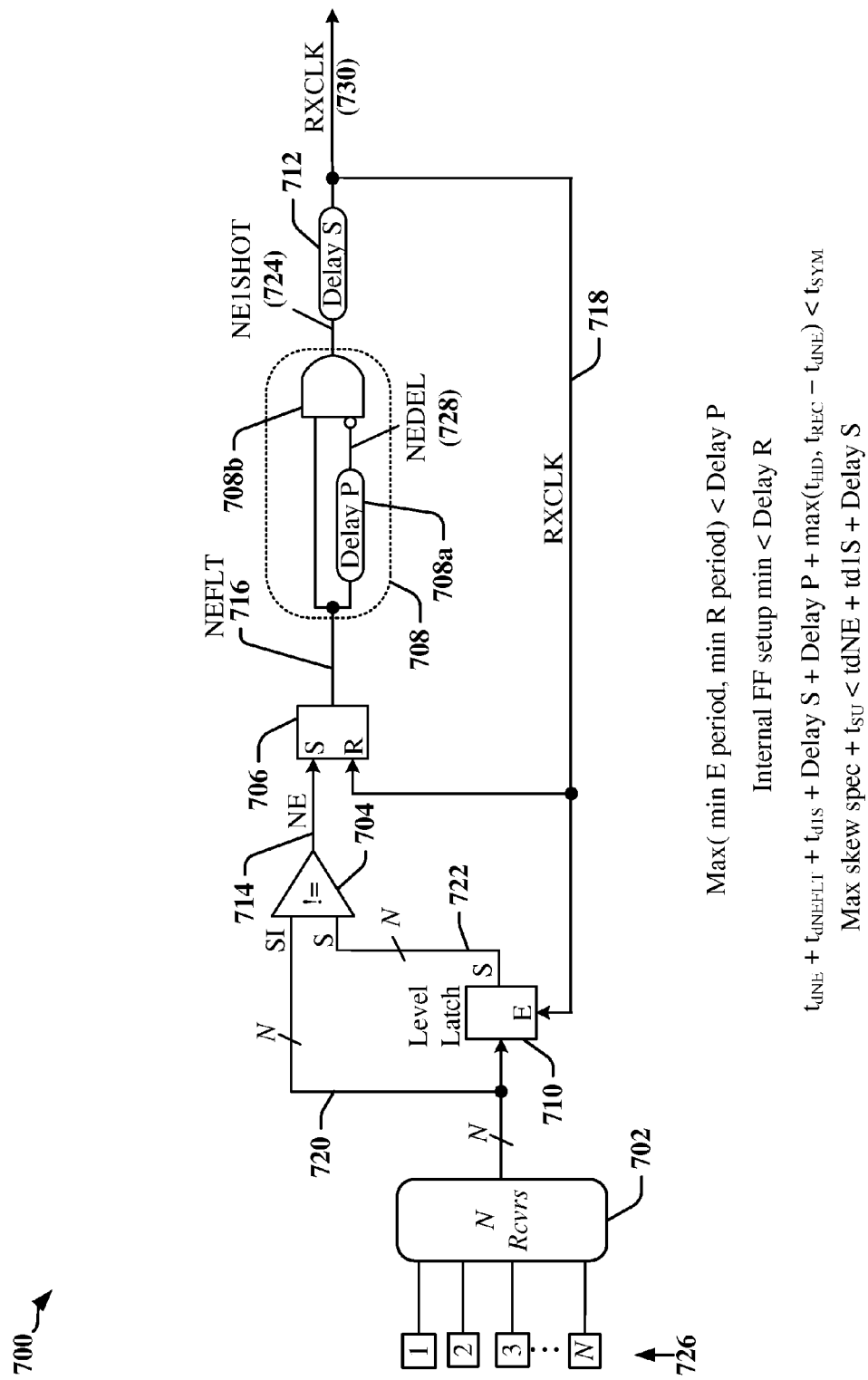
FIG. 7 is a block diagram illustrating one example of a clock and data recovery circuit (CDR) and a corresponding timing diagram.
Figure 8:
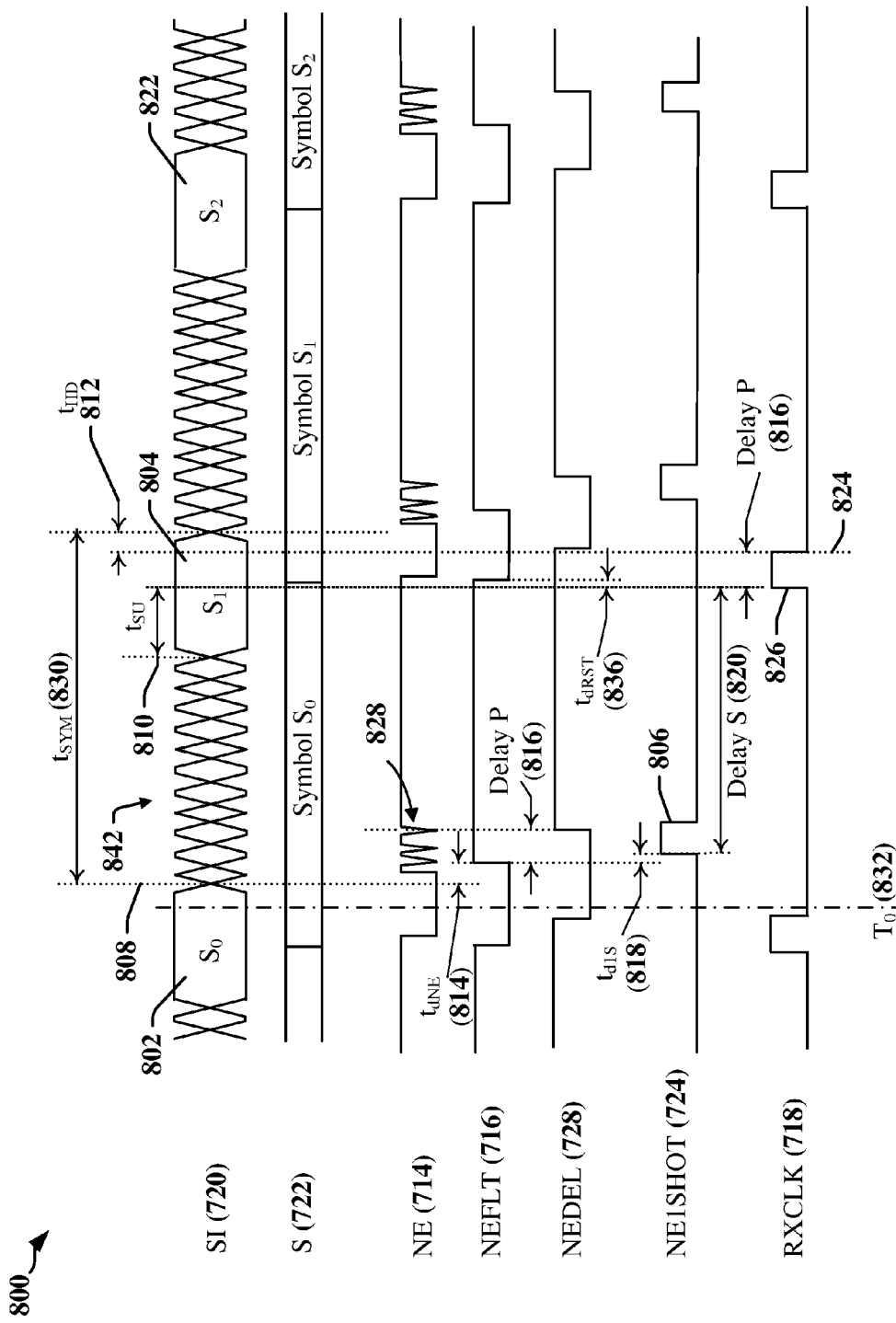
FIG. 8 is a timing diagram corresponding to the CDR circuit of FIG. 7.

FIG. 7 illustrates an example of a CDR circuit 700 that may be employed to recover embedded clock information in an interface configured for communications over N wires 726. FIG. 8 is a timing diagram illustrating certain aspects of signals generated through the operation of the CDR circuit 700. The CDR circuit 700 may include a comparator 704, a set-reset register 706, one-shot logic 708, which may include a first delay element 708a, a second delay device/element 712, and a register 710. One or both of the delay elements 708a, 712 may include digital and/or analog devices or circuits. The comparator 704 may be configured to compare a first instance of the first state transition signal (SI signal) 720 and a signal (S signal) 722 that is a registered instance of SI signal 720. The comparator 704 outputs a comparison signal (NE signal) 714 where, for example, the comparator 704 drives the NE signal 714 to a first state (e.g. logic low) when the SI signal 720 and the S signal 722 are equal, and to a second state (e.g. logic high) when the SI signal 720 and the S signal 722 are not equal. The NE signal 714 is in the second state when the SI signal 720 and the S signal 722 are representative of different symbols. Thus, the second state indicates that a transition is occurring.

The set-reset register 706 may receive the NE signal 714 from the comparator 704 and may be configured or controlled to produce a signal (NEFLT signal) 716 that is a filtered version of the NE signal 714. The one-shot logic 708 is configured to produce a pulse 806 (see FIG. 8) in its output signal (NE1SHOT signal) 724, where the duration of the pulse is determined or substantially determined by the delay introduced by the first delay element 708a. In one example, the first delay element 708a receives the NEFLT signal 716 and produces a signal (NEDEL) 728 that is a delayed version of the NEFLT signal 716. A logic element 708b of the one-shot logic 708 gates the NEFLT signal 716 with an inverted version of the NEDEL signal 728, thereby producing the pulse 806 in the NE1SHOT signal 724.

The second delay element 712 may be configured to receive the NE1SHOT signal 724 and produce a signal (RXCLK signal) 718 that is a delayed instance of the NE1SHOT signal. As shown in the illustrated CDR circuit 700, a "reset" input of the set-reset register 706 receives the RXCLK signal 718 and, consequently, the set-reset register 706 may be reset by the pulse 826 in the RXCLK signal 718. The register 710 is enabled by the RXCLK signal 718 and the pulse 826 in the RXCLK 718 may cause the register 710 to capture the received SI signal 720 as the S signal 722, which is the registered instance of the SI signal 720. The register 710 may be level triggered or edge triggered. As can be appreciated from the timing diagram 800, the value of the delay P 816 introduced by the first delay element 708a provides improved margins for setup time between symbols 802 and 804.

The following definitions are used in the timing diagram 800:

$t_{sym}$: one symbol cycle period 830,
$t_{SU}$: the setup time 810 of SI 720 for the register 710 referenced to the rising (leading) edge of the pulse 826 of RXCLK 718,
$t_{HD}$: the hold time 812 of SI 720 for the register 710 referenced to the falling (trailing) edge 824 of RXCLK 718,
$t_{dNE}$: the propagation delay 814 of the comparator 704,
$t_{dRST}$: the reset time 836 of the set-reset register 706 from the rising (leading) edge of the pulse 826 of RXCLK 718, and
$t_{d1S}$: the propagation delay 818 of the one-shot logic 708b.

Initially, at a time ($T_0$) 832 signals SI 720 and S 722 hold the previous symbol value $S_0$ 802, and the NE signal 714, the NEFLT signal 716, and the RXCLK signal 718 at the low logic level (e.g., zero volts). When a new symbol value ($S_1$) 704 is being received, it causes the SI signal 720 to start changing its value. The value of the SI signal 720 may be different from the value of $S_1$ 804 (valid data) due to the occurrence of intermediate or indeterminate states 842 during the signal transition from $S_0$ 702 S1 704. The intermediate or indeterminate states 842 may be caused, for example, by inter-wire skew, over/under shoot, cross-talk, etc.

The NE signal 714 switches to a logic high level as soon as the comparator 704 detects different value between the SI signal 720 and the S signal 722. Upon becoming high, the NE signal 714 synchronously or asynchronously sets the set-reset register 706 output, causing the NEFLT signal 716 to become high after the $t_{dNE}$ delay 814. The NEFLT signal 716 remains in the high state until the set-reset register 706 is reset by a high state of RXCLK signal 718. The RXCLK signal 718 transitions high in response to rising of NEFLT signal 716, after a delay period 820 that is mostly attributable to the second delay element 712.

The intermediate states on the SI signal 720 may be considered to represent invalid data and may contain a short period of the valid symbol value $S_0$ 802, causing the NE signal 714 to transition back low for short periods of time that may be observed as spikes 828 in the NE signal 714. The low state of the NE signal 714 does not affect the NEFLT signal 716, because the set-reset register 706 effectively filters out the spikes 828 on the NE signal 714.

The one-shot circuit 708 generates a high state on the NE1SHOT signal 724, after a delay ($t_{d1S}$) 818 caused by the rising edge of the NEFLT signal 716. The one-shot circuit 708 holds the NE1SHOT signal 724 at the high state for a delay period 816 introduced by the first delay element 708a, before the NE1SHOT signal 724 transitions to a low state. The resultant pulse 806 on the NE1SHOT signal 724 propagates to the RXCLK 718 after a delay period 820 that is mostly attributable to the second delay element 712.

The high state of RXCLK signal 718 resets the set-reset register 706, causing its output, the NEFLT signal 716, to transition low after a delay ($t_{dRST}$) 836. The high state of RXCLK signal 718 also enables the register 710, causing the value of the SI signal 720 to be output as the S signal 722.

The comparator 704 detects when the S signal 722 changes to match the symbol value of $S_1$ 804 on the SI signal, and drives the NE signal 714 low.

The low state of NE1SHOT signal 724 propagates to the RXCLK signal 718 after a delay period 820 that is mostly attributable to the second delay element 712.

When a new symbol value ($S_2$) 822 is being received, the SI signal 720 begins changing its value to the next symbol ($S_2$) 822 after a delay ($t_{HD}$) 812 from the falling edge 824 of the pulse 826 in the RXCLK signal 718.

The timing constraint for the symbol cycle period $t_{SYM}$ may be as follows:

$$t_{dNE}+t_{d1S}+\text{Delay S}+\text{Delay P}+t_{HD}<t_{SYM}.$$

More specifically, the symbol cycle time ($t_{SYM}$) 830 must be greater than total of: the S delay period 820, the P delay period 816, $t_{HD}$ 812, $t_{dNE}$ 814, $t_{d1S}$ 818 and $t_{dRST}$ 836. If the total of these six time periods exceeds the $t_{SYM}$ period 830, then the trailing edge of a pulse on the RXCLK signal 718 overlaps the next symbol cycle, preventing the NEFLT signal 716 from being set for the overlapping period. Note that the amount of overlapping period accumulates cycle by cycle and eventually results in an extra pulse on the RXCLK signal 718 in one symbol cycle.

The timing constraint for the setup time $t_{SU}$ 810 may be characterized as follows:

Maximum skew specification+$t_{SU}$<Delay S.

More specifically, the delay period S 820 must be less than the setup time $t_{SU}$ plus the maximum skew.

Figure 9:
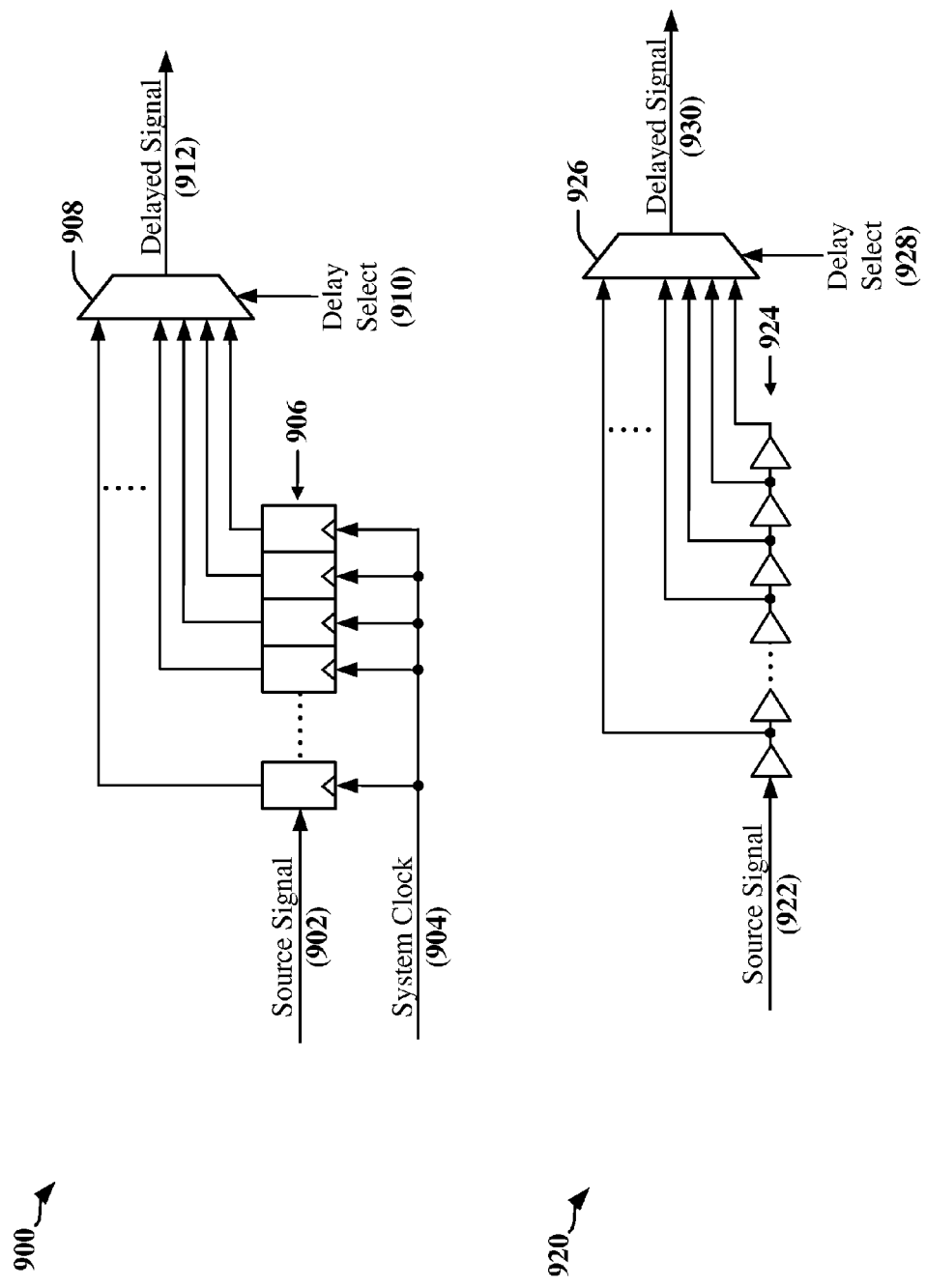
FIG. 9 illustrates certain examples of delay elements that can be used by the CDR circuit of FIG. 7.

FIG. 9 illustrates examples of delay elements 900 and 920 that may be employed in the CDR circuit 700 of FIG. 7. The delay elements 900, 920 may be used to implement the first delay element 708a and/or the second delay element 712 of the CDR circuit 700. In a first delay element 900, an internal system clock 904 may be used to drive digital delay cells 906 to implement one or both of the delay elements 708a and 712 when the communications link is operated at a data rate that is slow enough in relation to the system clock 904. A source signal 902 is introduced to a delay line of digital delay cells 906 that are clocked by the system clock 904. A multiplexer 908 may be used to select one of the outputs of the digital delay cells 906 to provide a delayed signal 912, where the delay value may be programmed using a delay select signal 910 to select a desired propagation delay through the delay cells 906.

In the second delay element 920, an analog delay line may be implemented using a plurality of analog delay cells 924, which may include buffers, inverters and/or logic gates, for example. The analog delay line may be used to implement the first and second delay elements 708a, 712 in communications links that are operated at a data rate that is fast in comparison to system clocks. A source signal 922 is introduced to a delay line of analog delay cells 924. A multiplexer 926 may be used to select one of the outputs of the analog delay cells 924 to provide a delayed signal 930, where the delay value may be programmed using a delay select signal 928 to select a desired delay.

Figure 10:
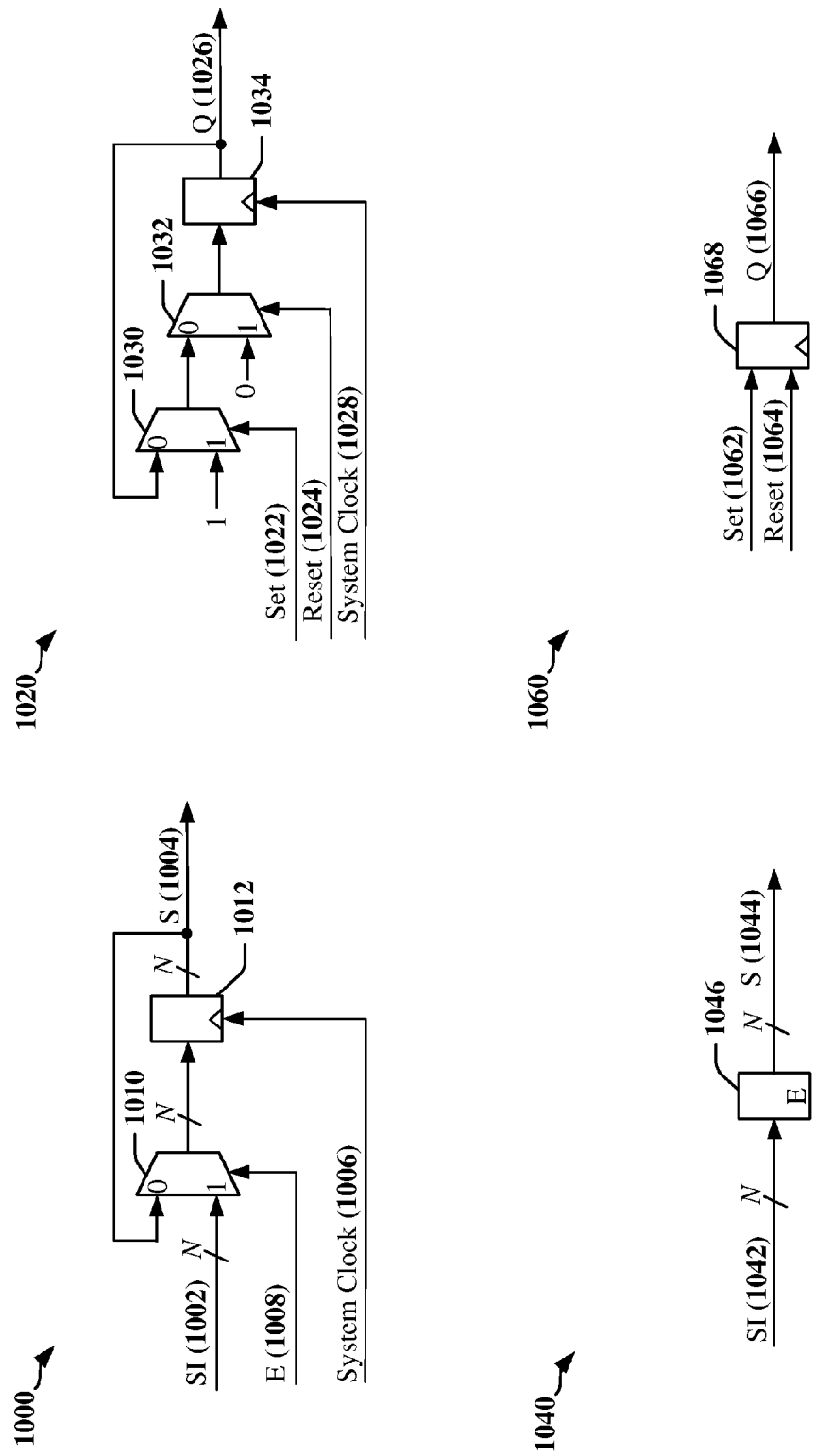
FIG. 10 illustrates certain examples of registers that can be used by the CDR circuit of FIG. 7.

FIG. 10 illustrates examples of registers 1000, 1040 that may be used as register 710, and set-reset registers 1020, 1060 that may be used as the set-reset register 706 in the CDR circuit 700 of FIG. 7. In a first example, an internal system clock 1006 may be used to drive a register 1012 to provide an output 1004 synchronized to the system clock 1006. A multiplexer 1010 is used to select between an input signal 1002 and a copy of the registered output 1004. The input signal 1002 is captured at an edge of the system clock 1006 when an enable signal 1008 is high, where the enable signal 1008 operates as a select signal to the multiplexer. This synchronous register 1000 may be used when the communication link operates at a data rate that is slow enough to allow use of the internal system clock 1006. When the data rate of the communication link is high relative to the system clock, an asynchronous register 1040 may be used.

A synchronous set-reset register 1020 may be used when the communication link operates at a data rate that is slow enough to allow use of the internal system clock 1028. Here the internal system clock 1028 may be used to drive a register 1034 that captures the output of a multiplexing circuit having two multiplexers 1030 and 1032. The Set input 1022 and Reset input 1024 control the selection of inputs to the multiplexers for their respective outputs. If both the Set input 1022 and the Reset input 1024 are low, the prior output 1026 of the register 1034 is selected at an edge of the system clock 1028. When the Set input 1022 is set to one, a logic 1 is provided as the output 1026 at the edge of the system clock 1028, provided the Reset input 1024 is low. If the Reset input 1024 is high, the output 1026 is cleared at the edge of the system clock 1028. When the data rate of the communication link is high relative to the system clock, an asynchronous set-reset register 1060 may be used.

The synchronous registers 1000 and 1020 provide signals that are fully synchronous with the system clock 1006, 1028. For the link whose data rate is fast, an asynchronous latch 1040 may be used to sample the SI signal 720 and an asynchronous set-reset register 1060 may be used for generating the NEFLT 716 signal.

Figure 11:
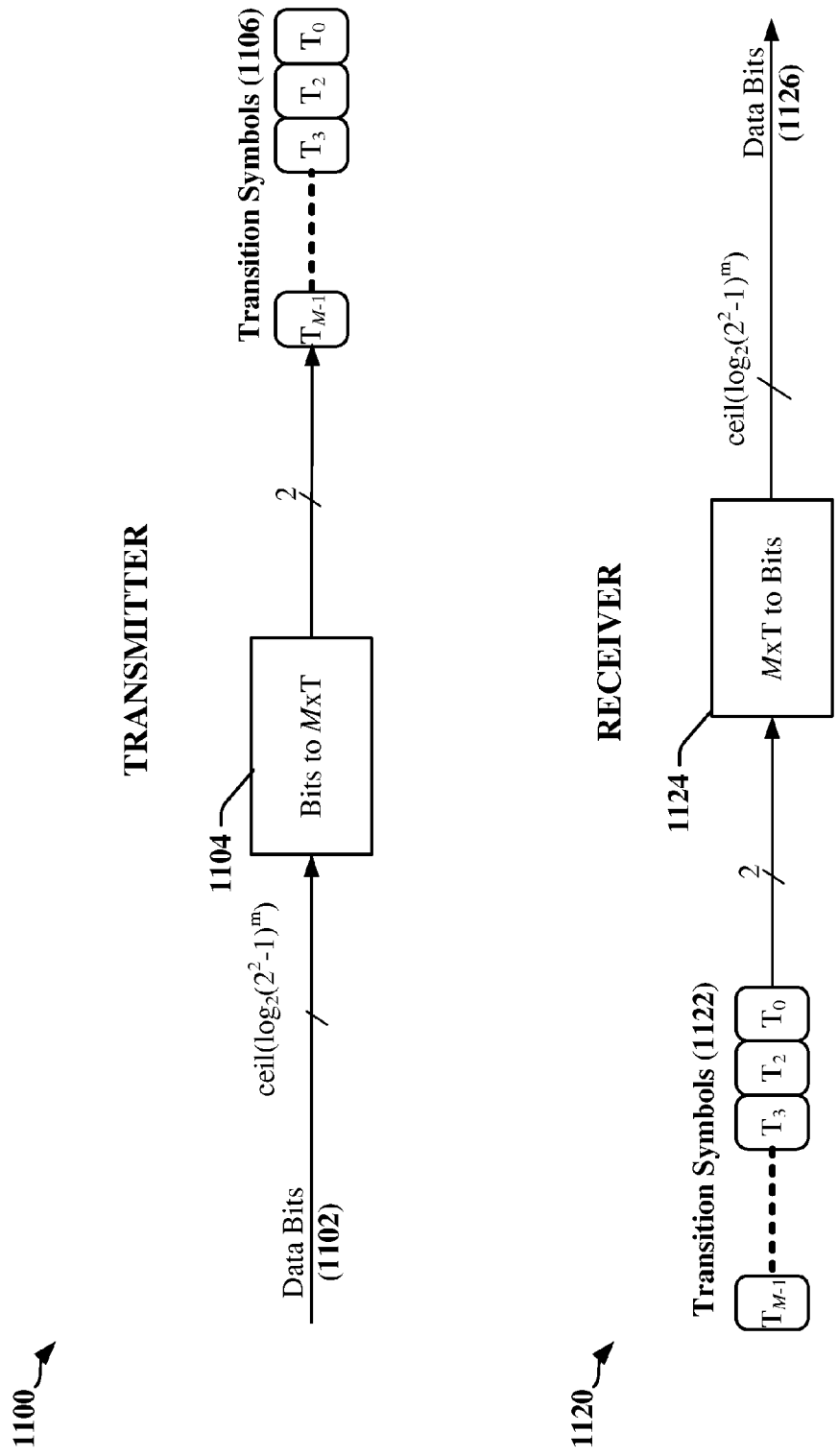
FIG. 11 illustrates an example of the conversion of data bits to transition symbols and from transition symbols to data bits according to certain aspects disclosed herein.

FIG. 11 is a simplified block diagram illustrating the conversion from bits 1102 to transition symbols 1106 at a transmitter 1100 and then from transition symbols 1122 to bits 1126 at a receiver 1120. In the example, the symbols are transmitted in a 2-wire (i.e., N=2) system, although any other number of wires/conductors may be used. In the transmitter 1100, bits 1102 of binary information are provided to a first converter (Bits to M×T) converter 1104 to generate M symbol transition numbers ($T_0$ to $T_{M-1}$) 1106. The receiver 1120 receives the M symbol transition numbers ($T_0$ to $T_{M-1}$) 1122, which are provided to a second converter (M×T to Bits) 1124 to retrieve the bits of binary information 1126. Given R possible symbol transition states for each transition (T=$T_0$ to $T_{M-1}$) 1106, the M transitions can transmit $R^M$ different states. In an N-wire system, $R=2^N-1$. Consequently, the transitions $\{T_0, T_1, \ldots, T_{M-1}\}$ can include data encoded in $(2^N-1)^M$ different states.

In an example where the possible symbol transitions for each T, R=10 and the number of symbols in a group M=3, each of the 3 transition symbols $\{T_2, T_1, T_0\}$ can have the value $T_i=\{0, 1, 2, \ldots, 9\}$. Thus, each transition symbol can have 10 different states and the transition symbol for each transition in $\{T_2, T_1, T_0\}$ may be a 3-digit decimal number. In one example, $T_2=3$, $T_1=9$, $T_0=1$, which may be expressed as the decimal number 391. In this manner a sequence of bits may be converted into a plurality of transition symbols and vice versa.

In the example of a 2-wire system, where N=2 and M=12, it may be assumed the possible symbol transition for each transition $R=2^N-1=2^2-1=3$. If the number M of symbols in a group is 12, The sequence of symbols $\{T_{11}, T1_0, \ldots, T_0\}$ may be represented as a 12-digit ternary (base-3) number, where each $T_i$: $\{0, 1, 2\}$. For example, for $\{T_{11}, T1_0, \ldots, T_0\}=\{2, 1, 0, 0, 1, 1, 0, 1, 0, 1, 2, 1\}$, the ternary number is:

$$2100\_1101\_0121_3 \text{(Ternary number)} =$$
$$2\times 3^{11} + 1\times 3^{10} + 0\times 3^9 + 0\times 3^8 + 1\times 3^7 + 1\times 3^6 + 0\times 3^5 +$$
$$1\times 3^4 + 0\times 3^3 + 1\times 3^2 + 2\times 3^1 + 1\times 3^0 = 416356(0x65A64).$$

In this manner, 12 transitions numbers may be converted into a number. Note that the transition number $2100\_1101\_0121_3$ may be used as the transition number in FIGS. 4 and 5, so that each integer may be mapped to a sequential symbol and vice versa.

Figure 12:
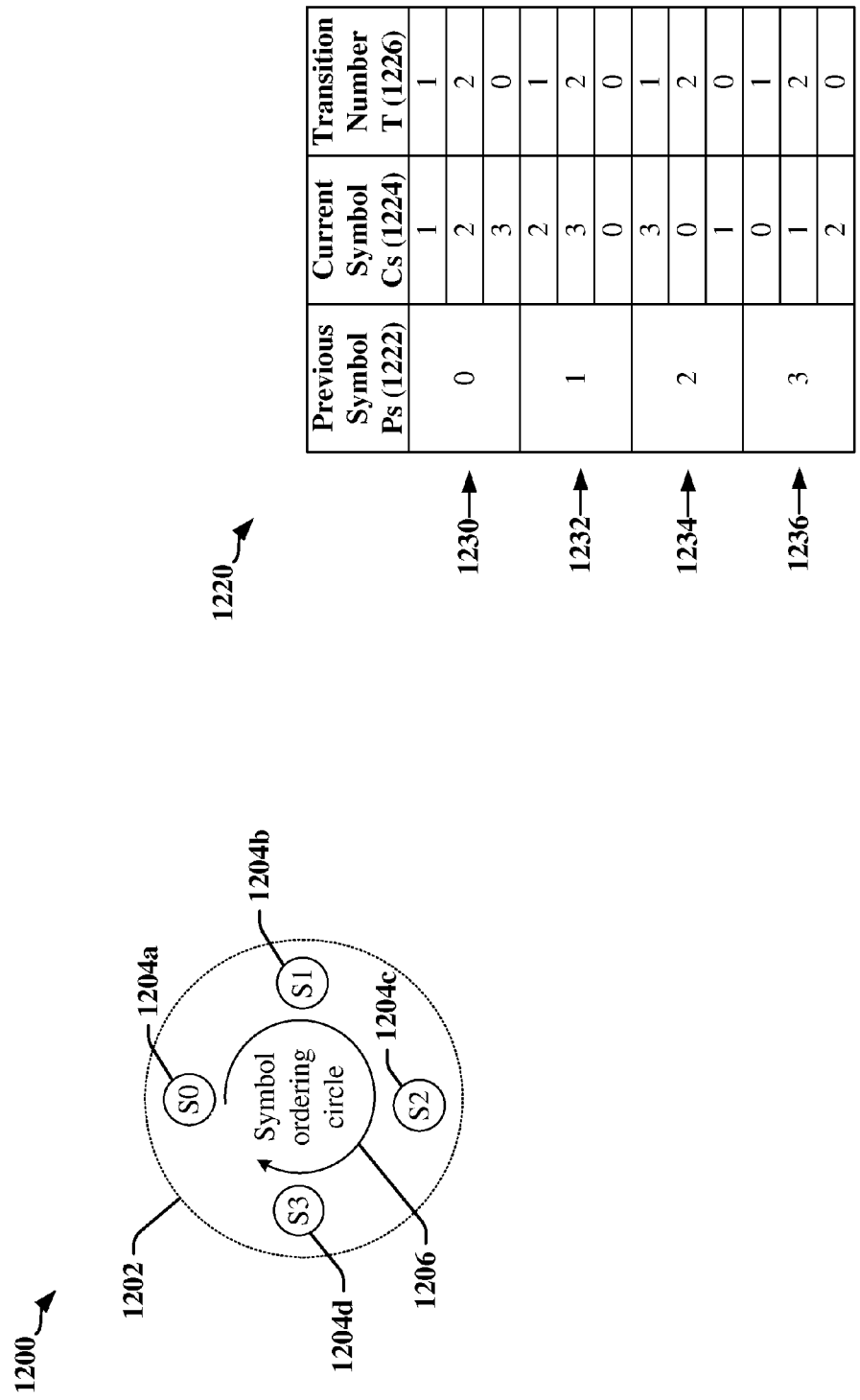
FIG. 12 is an example of an encoding scheme used to convert between symbols and transitions.

FIG. 12 illustrates the conversion between sequential symbols and transition symbols in one example. In the example, a conversion may be performed whereby each transition from a previous sequential symbol number (Ps) 1222 to a current sequential symbol number (Cs) 1224 may be mapped to a transition number (T) 1226. At a transmitting device 1100 (see FIG. 11), each transition symbol number 1226 is converted to a current sequential symbol number 1224 based on the value of the immediately preceding previous sequential symbol number (Ps) 1222. This relative conversion scheme can guarantee that two consecutive sequential symbols numbers 1224 will generate the same signaling state on the N wires of the interface.

In one example for a 2-wire system, 4 raw symbols are assigned to 4 sequential symbol numbers S0 1204*a*, S1 1204*b*, S2 1204*c*, and S3 1204*d*. As illustrated by the symbol ordering diagram 1200, these symbols 1204*a*-1204*d* may be arranged in an ordering circle 1202, here in a clockwise sequence. A current symbol may be selected using the transition number value 1226 to indicate the number of steps on the ordering circle 1202 from the previous symbol 1222 to the current symbol. The table 1220 of FIG. 12 illustrates this example of a transition number (T) 1226 that can represent the relative distance of or between the 4 sequential symbol numbers 1204*a*-1204*d* in the symbol ordering diagram 1200. The value of the transition number (T) 1226 may be used to select a current symbol 1224 given a previous symbol 1222.

For a transmitter, the current sequential symbol number (Cs) 1224 may be determined based on a given transition number T 1226 as follows:

$$T_{tmp}=(T==0?3:T)$$

$$Cs=Ps+T_{tmp},$$

assuming T is 2-bits wide, and copies only the two least significant bits (2-LSB) of $T_{tmp}$. For a receiver, a symbol may be converted to a transition number T 1226 as follows:

$$T_{tmp}=4+Cs-Ps$$

$$T=(T_{tmp}=3?0:T_{tmp}),$$

assuming T is 2-bits wide, and copies only the 2-LSB of $T_{tmp}$.

A similar approach may be used for other N-wire systems by constructing a mapping of sequential symbol number to transition number table for any value of N including, for example, N=4, N=5, N=6, and so on. In this manner, it can be guaranteed that the signaling state of at least one of the N wires is changed between each pair of sequential symbols.

In one example, in the case of an N-wire system, the transition number T may be assigned according to:

$$T=Ps+1\leq Cs$$

$$?Cs-(Ps+1)$$

$$:Cs-(Ps+1)+2^N.$$

Conversely, in the case of an N-wire system, the current sequential symbol number (Cs) may be assigned according to:

$$Cs=Ps+1+T<2^N$$

$$?Ps+1+T$$

$$:Ps+1+T-2^N.$$

It is contemplated that the formula used conversion between sequential symbols and transition may vary between signaling schemes for reasons of efficiency, ease of implementation and so on. Thus, for example, a roll-over mechanism is used in some CCIe systems where a three-step difference between current and previous symbols causes a roll-over in the transition number calculation. That is to say, a 1 step difference results in a value of T=1, a two step difference results in a value of T=2, while the three step difference results in a value of T=0. In another N-wire system, where the difference (diff) between current and previous symbols can range between 1 and R, the transition number may be calculated simply as T=diff−1, and the transition number ranges between 0 and R−1.

Depending upon the number of wires or conductors used and the number of symbols or groups selected, different utilization percentages may be achieved. In this regard, "utilization" may refer to the efficiency with which a number of bits per group may be sent. In these example, utilization may be represented as a percentage between an integer number of bits per group that are transmitted and a theoretical number of bits per group that may be transmitted for a given number of conductors and symbols per group.

FIG. 13 illustrates a utilization table for a 2-wire system using all available 3-symbol transitions at various symbols per group. In this example, 1.5833 bits/cycle can be sent by 12 symbols/group, while a 1 symbol/group can only send 1 bit/cycle.

FIG. 14 illustrates a utilization table for a 3-wire system using all available 7-symbol transitions at various symbols per group. In this example, 2.7917 bits/cycle can be sent by 24 symbols/group, while a 1 symbol/group can only send 2 bits/cycle. Note that this results in 67 bits of information being sent (or 99.44% utilization). For example, the 67 bits can be used for 64 data bits and 3 control bits.

FIG. 15 illustrates a utilization table for a 3-wire system using all available 6-symbol transitions (by reserving 1 state for a special purpose) at various symbols per group. In this example, 2.5769 bits/cycle can be sent by 26 symbols/group, while 1 symbol/group can only send 2 bits/cycle. Note that this results in 67 bits of information being sent (or 99.69% utilization).

Some systems may not use some states among all the available symbol states. For example for N=3 the state "111" may be reserved for other purposes. In the table in FIG. 15, 1 state has been dumped and/or reserved from a total of 8 symbol states. The available transition number is then 6=8−2 (i.e., transitions to all states other than self and the reserved/dumped state).

FIG. 16 illustrates a utilization table for a 4-wire system using all available 15-symbol transitions at various symbols per group. In this example, 3.9 bits/cycle can be sent by 10 symbols/group, while 1 symbol/group can only send 3 bits/cycle. Note that this results in 39 bits of information being sent (or 99.82% utilization).

FIG. 17 illustrates a utilization table for a 4-wire system using all available 14-symbol transitions (by reserving 1 state for a special purpose) at various symbols per group. In this example, 3.9 bits/cycle can be sent by 10 symbols/group, while 1 symbol/group can only send 3 bits/cycle. Note that this results in 38 bits of information being sent (or 99.81% utilization).

Some systems may not use certain states among all the available symbol states. For example for n=4 the state "1111" may be reserved for other purposes. In the table in FIG. 17, 1 state has been dumped from a total of 16 symbol states. The available transition number is then 14=16−2 (i.e., transitions to all states other than self and the reserved/dumped state).

FIG. 18 illustrates a utilization table for a 5-wire system using all available 31-symbol transitions at various symbols per group.

FIG. 19 illustrates a utilization table for a 5-wire system using all available 30-symbol transitions (by reserving 1 state for a special purpose) at various symbols per group.

FIG. 20 illustrates a utilization table for an 8-wire system using all available 255-symbol transitions at various symbols per group.

FIG. 21 illustrates a utilization table for an 8-wire system using all available 254-symbol transitions (by reserving 1 state for a special purpose) at various symbols per group.

Figure 22:
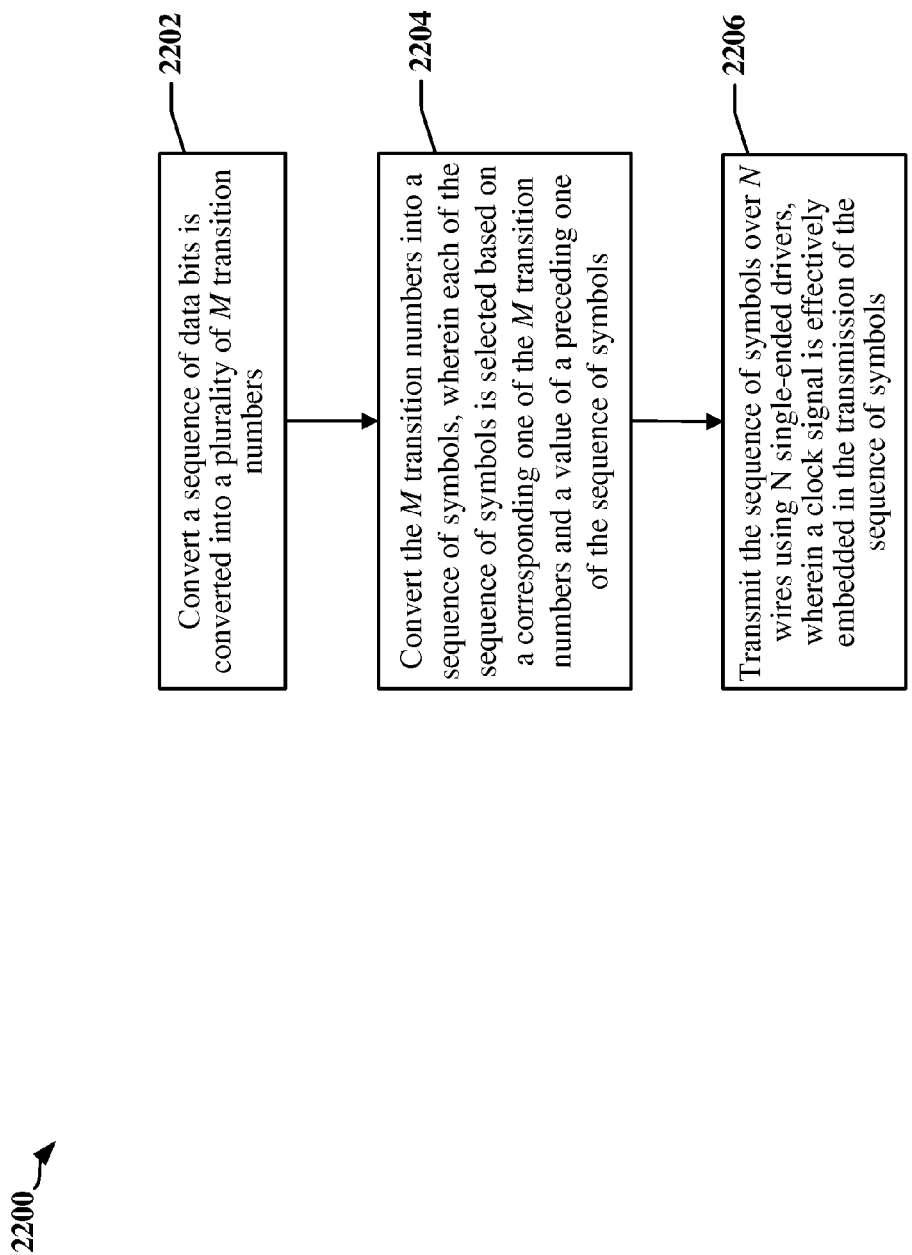
FIG. 22 is a flow chart of a method for operating a receiver in an N-wire interface provided according to one or more aspects disclosed herein.

FIG. 22 is a flowchart 2200 illustrating a method for data communications on an N-wire communications link. The communications link may include a plurality of connectors that carry symbols encoded using a suitable encoding scheme. The connectors may include electrically conductive wires, optical signal conductors, semi-conductive interconnects and so on. The method may be performed by one or more processors of a transmitting device.

At step 2202, a sequence of data bits is converted into a plurality of M transition numbers.

At step 2204, the M transition numbers is converted into a sequence of symbols. Each of the sequence of symbols may be selected based on a corresponding one of the M transition numbers and a value of a preceding one of the sequence of symbols. The conversion from the M transition numbers into the sequence of symbols may guarantee that no two sequentially occurring symbols in the sequence of symbols are the same.

According to certain aspects disclosed herein, converting the M transition numbers into the sequence of symbols may include determining an immediate predecessor symbol in the sequence of symbols for each of the M transition numbers. Converting the M transition numbers into the sequence of symbols may include selecting as a next symbol in the sequence of symbols, a symbol identified by using the each transition number as an offset from the immediate predecessor symbol for each of the M transition numbers.

According to certain aspects disclosed herein, each symbol in the sequence of symbols may be selected from a plurality of available symbols. Each of the plurality of available symbols corresponds to a signaling state of the N wires that is different from the signaling states that correspond to the other symbols in the plurality of available symbols. Each of the sequence of symbols may be associated with a number R of possible symbol transition states for each transition number. The sequence of symbols may be associated with a number R of possible signaling states associated with each symbol in the plurality of available symbols. The sequence of symbols may provide $R^M$ different states. The $R^M$ different states may determine a number of bits that can be encoded in the sequence of symbols.

At step 2206, the sequence of symbols is transmitted over N wires using N single-ended drivers. A clock signal may be effectively embedded in the transmission of the sequence of symbols.

Figure 23:
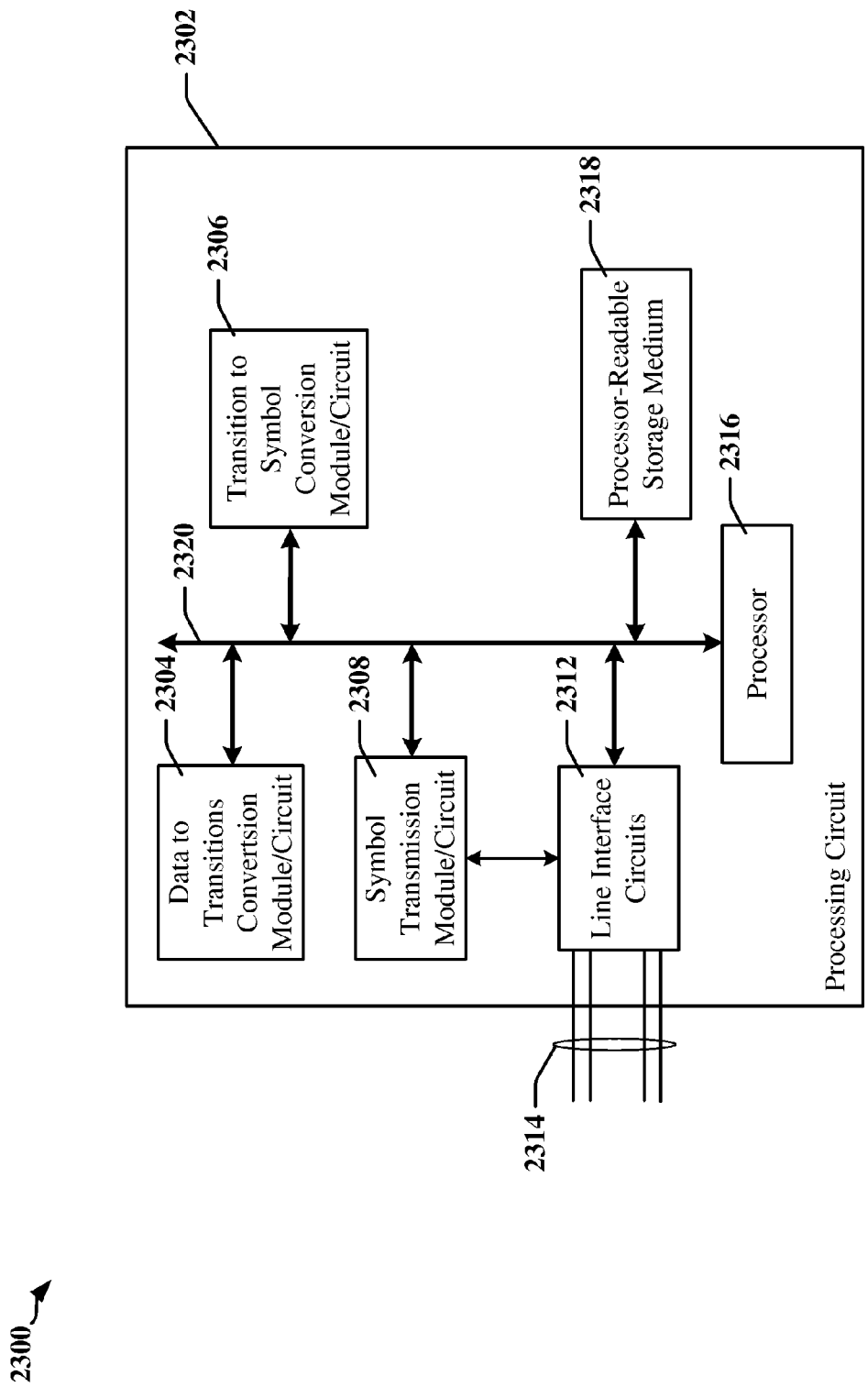
FIG. 23 is a diagram illustrating a simplified example of a receiver in an N-wire interface provided according to one or more aspects disclosed herein.

FIG. 23 is a diagram illustrating a simplified example of a hardware implementation for an apparatus 2300 employing a processing circuit 2302. The processing circuit typically has a processor 2316 that may include one or more of a microprocessor, microcontroller, digital signal processor, a sequencer and a state machine. The processing circuit 2302 may be implemented with a bus architecture, represented generally by the bus 2320. The bus 2320 may include any number of interconnecting buses and bridges depending on the specific application of the processing circuit 2302 and the overall design constraints. The bus 2320 links together various circuits including one or more processors and/or hardware modules, represented by the processor 2316, the modules or circuits 2304, 2306 and 2308, line interface circuits 2312 configurable to communicate over connectors or wires 2314 and the computer-readable storage medium 2318. The bus 2320 may also link various other circuits such as timing sources, peripherals, voltage regulators, and power management circuits, which are well known in the art, and therefore, will not be described any further.

The processor 2316 is responsible for general processing, including the execution of software stored on the computer-readable storage medium 2318. The software, when executed by the processor 2316, causes the processing circuit 2302 to perform the various functions described supra for any particular apparatus. The computer-readable storage medium 2318 may also be used for storing data that is manipulated by the processor 2316 when executing software, including data decoded from symbols transmitted over the connectors or wires 2314. The processing circuit 2302 further includes at least one of the modules 2304, 2306 and 2308. The modules 2304, 2306 and 2308 may be software modules running in the processor 2316, resident/stored in the computer readable storage medium 2318, one or more hardware modules coupled to the processor 2316, or some combination thereof. The modules 2304, 2306 and/or 2308 may include microcontroller instructions, state machine configuration parameters, or some combination thereof.

In one configuration, the apparatus 2300 for wireless communication includes a module and/or circuit 2304 configured to convert a sequence of data bits into a plurality of M transition numbers, a module and/or circuit 2306 configured to convert the M transition numbers into a sequence of symbols, modules and/or circuits 2308, 2312 configured to transmit the sequence of symbols over N wires 2314 using N single-ended drivers.

Figure 24:
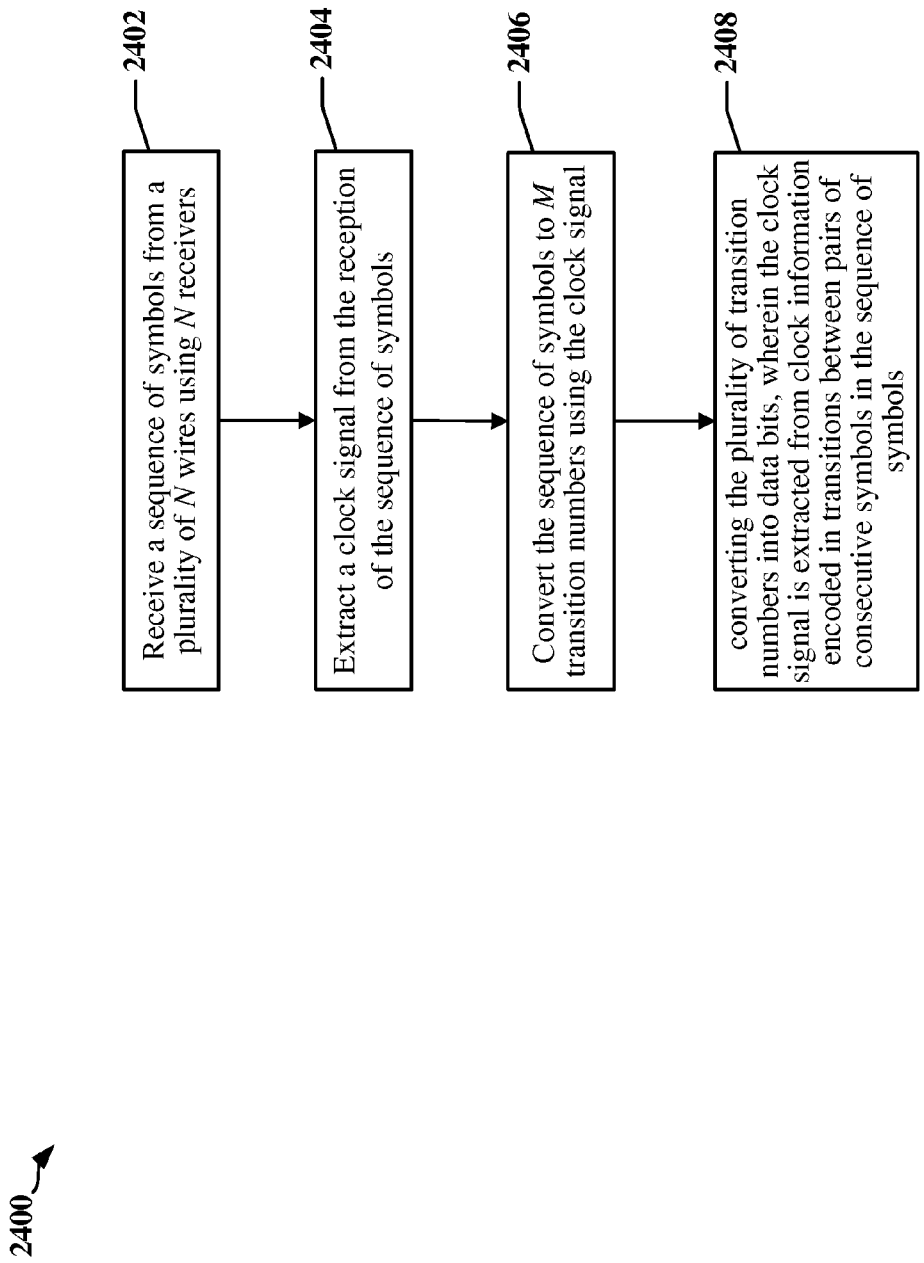
FIG. 24 is a flow chart of a method for operating a transmitter in an N-wire interface provided according to one or more aspects disclosed herein.

FIG. 24 is a flowchart 2400 illustrating a method for data communications on an N-wire communications link. The communications link may include a plurality of connectors that carry symbols encoded using a suitable encoding scheme. The connectors may include electrically conductive wires, optical signal conductors, semi-conductive interconnects and so on. The method may be performed by one or more processors of a receiving device.

At step 2402, a sequence of symbols is received over a plurality of N wires using N receivers.

At step 2404, a clock signal is extracted from the reception of the sequence of symbols. The clock signal may be extracted from clock information encoded in transitions between pairs of consecutive symbols in the sequence of symbols. Each pair of consecutive symbols in the sequence of symbols may have two different symbols.

At step 2406, the sequence of symbols is converted to M transition numbers using the clock signal. The sequence of symbols may be converted to the M transition numbers by using the clock to identify a transition in signaling state of the N wires, and calculating a transition number based on a difference in a first symbol associated with a signaling state occurring before the identified transition and a second symbol associated with a signaling state occurring after the identified transition. The second symbol may correspond to one of a number R of possible signaling states.

At step 2408, the plurality of transition numbers is converted into data bits.

According to certain aspects disclosed herein, each possible signaling state of the N wires may correspond to a different one of a plurality of available symbols.

Figure 25:
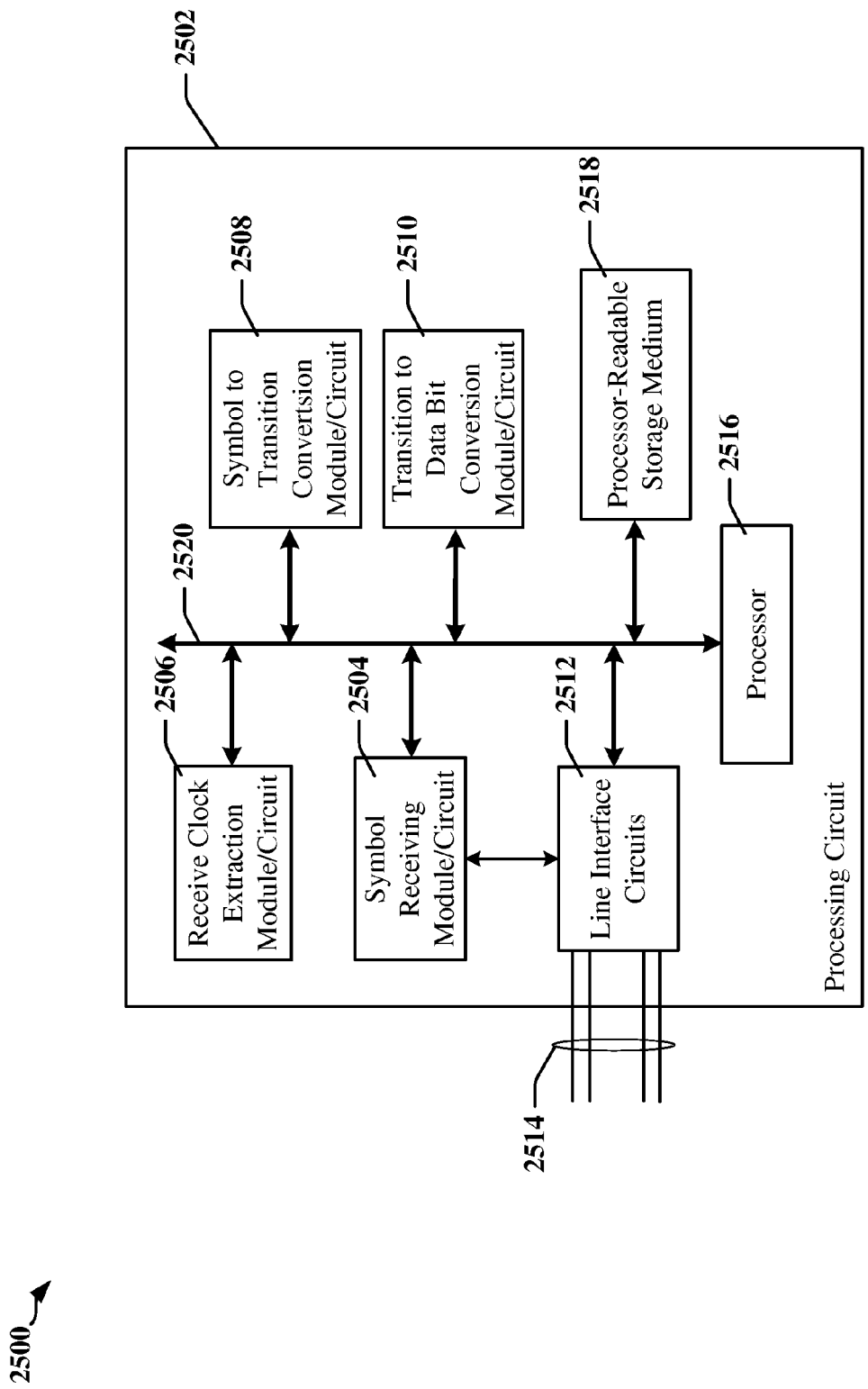
FIG. 25 is a diagram illustrating a simplified example of a transmitter in an N-wire interface provided according to one or more aspects disclosed herein.

FIG. 25 is a diagram illustrating a simplified example of a hardware implementation for an apparatus 2500 employing a processing circuit 2502. The processing circuit typically has a processor 2516 that may include one or more of a microprocessor, microcontroller, digital signal processor, a sequencer and a state machine. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the processor 2516, the modules or circuits 2504, 2506, 2508 and 2510, line interface circuits 2512 configurable to communicate over connectors or wires 2514 and the computer-readable storage medium 2518. The bus 2520 may also link various other circuits such as timing sources, peripherals, voltage regulators, and power management circuits, which are well known in the art, and therefore, will not be described any further.

The processor 2516 is responsible for general processing, including the execution of software stored on the computer-readable storage medium 2518. The software, when executed by the processor 2516, causes the processing circuit 2502 to perform the various functions described supra for any particular apparatus. The computer-readable storage medium 2518 may also be used for storing data that is manipulated by the processor 2516 when executing software, including data decoded from symbols transmitted over the connectors or wires 2514. The processing circuit 2502 further includes at least one of the modules 2504, 2506, 2508 and 2510. The modules 2504, 2506, 2508 and 2510 may be software modules running in the processor 2516, resident/stored in the computer readable storage medium 2518, one or more hardware modules coupled to the processor 2516, or some combination thereof. The modules 2504, 2506, 2508 and/or 2510 may include microcontroller instructions, state machine configuration parameters, or some combination thereof.

In one configuration, the apparatus 2500 for wireless communication includes modules and/or circuits 2504, 2512 configured to receive a sequence of symbols from over a plurality of N wires 2514 using N receivers, a module and/or circuit 2506 configured to extract a clock signal from the reception of the sequence of symbols, a module and/or circuit 2508 configured to convert the sequence of symbols to M transition numbers using the clock signal, and a module and/or circuit 2510 configured to convert the plurality of transition numbers into data bits.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for multi-wire signaling, comprising:
   converting a sequence of data bits into a plurality of M transition numbers, where M is an integer greater than 1;
   converting the M transition numbers into a sequence of symbols, wherein each of the sequence of symbols is selected based on a corresponding one of the M transition numbers and a value of a preceding one of the sequence of symbols; and
   transmitting the sequence of symbols over N wires using N single-ended drivers, where N is an integer greater than 1,
   wherein a clock signal is effectively embedded in the sequence of symbols.

2. The method of claim 1, wherein the conversion from the M transition numbers into the sequence of symbols guarantees that each two sequentially occurring symbols in the sequence of symbols are different.

3. The method of claim 1, wherein converting the M transition numbers into the sequence of symbols comprises, for each of the M transition numbers:
   determining an immediate predecessor symbol in the sequence of symbols; and
   selecting as a next symbol in the sequence of symbols, a symbol identified by using the each transition number as an offset from the immediate predecessor symbol.

4. The method of claim 1, wherein each symbol in the sequence of symbols is selected from a plurality of available symbols, and wherein each of the plurality of available symbols corresponds to a signaling state of the N wires that is different from the signaling states that correspond to all other symbols in the plurality of available symbols.

5. The method of claim 4, wherein each of the sequence of symbols is associated with a number R of possible symbol transition states for each transition number, where R is equal to $2^N-1$.

6. The method of claim 4, wherein the sequence of symbols is associated with a number R of possible signaling states associated with each symbol in the plurality of available symbols, and wherein the sequence of symbols provides $R^M$ different states.

7. The method of claim 6, wherein the $R^M$ different states determine a number of bits that can be encoded in the sequence of symbols.

8. A transmitter, comprising:
   a plurality of single-ended drivers; and
   a processing circuit configured to:
     convert a sequence of data bits into a plurality of M transition numbers, where M is an integer greater than 1;
     convert the M transition numbers into a sequence of symbols, wherein each of the sequence of symbols is selected based on a corresponding one of the M transition numbers and a value of a preceding one of the sequence of symbols; and
     transmit the sequence of symbols over N wires using N single-ended drivers, where N is an integer greater than 1,
     wherein a dock signal is effectively embedded in the sequence of symbols.

9. The transmitter of claim 8, wherein conversion from the M transition numbers into the sequence of symbols guarantees that each two sequentially occurring symbols in the sequence of symbols are different.

10. The transmitter of claim 8 wherein, for each of the M transition numbers the processing circuit is configured to:
   determine an immediate predecessor symbol in the sequence of symbols; and
   select as a next symbol in the sequence of symbols, a symbol identified by using the each transition number as an offset from the immediate predecessor symbol.

11. The transmitter of claim 8, wherein each symbol in the sequence of symbols is selected from a plurality of available symbols, and wherein each of the plurality of available symbols corresponds to a signaling state of the N wires that is different from the signaling states that correspond to all other symbols in the plurality of available symbols.

12. The transmitter of claim 11, wherein each of the sequence of symbols is associated with a number R of possible symbol transition states for each transition number, where R is equal to $2^N-1$.

13. The transmitter of claim 11, wherein the sequence of symbols is associated with a number R of possible signaling states associated with each symbol in the plurality of available symbols, and wherein the sequence of symbols provides $R^M$ different states.

14. The transmitter of claim 13, wherein the $R^M$ different states determine a number of bits that can be encoded in the sequence of symbols.

15. A method for performing multi-wire signaling decoding, comprising:
   receiving a sequence of symbols from a plurality of N wires using N receivers, where N is an integer greater than 1;
   extracting a dock signal from the sequence of symbols;
   converting the sequence of symbols to M transition numbers using the dock signal, where M is an integer greater than 1; and
   converting the M transition numbers into data bits,
   wherein the dock signal is extracted from dock information encoded in transitions between pairs of consecutive symbols in the sequence of symbols.

16. The method of claim 15, wherein each pair of consecutive symbols in the sequence of symbols comprises two different symbols.

17. The method of claim 15, wherein converting the sequence of symbols to the M transition numbers comprises:
   using the clock to identify a transition in signaling state of the N wires; and
   calculating a transition number based on a difference in a first symbol associated with a signaling state occurring before the transition and a second symbol associated with a signaling state occurring after the transition.

18. The method of claim 17, wherein the second symbol corresponds to one of a number R of possible signaling states, where R is equal to $2^N-1$.

19. The method of claim 18, wherein each possible signaling state of the N wires corresponds to a different one of a plurality of available symbols.

20. A receiving device, comprising:
   a plurality of receivers; and
   a processing circuit configured to:
      receive a sequence of symbols from a plurality of N wires using N receivers, where N is an integer greater than 1;
      extract a clock signal from the sequence of symbols;
      convert the sequence of symbols to M transition numbers using the dock signal, where M is an integer greater than 1; and
      convert the M transition numbers into data bits,
   wherein the dock signal is extracted from dock information encoded in transitions between pairs of consecutive symbols in the sequence of symbols.

21. The receiving device of claim 20, wherein each pair of consecutive symbols in the sequence of symbols comprises two different symbols.

22. The receiving device of claim 20, wherein the processing circuit is further configured to:
   use the clock to identify a transition in signaling state of the N wires; and
   calculate a transition number based on a difference in a first symbol associated with a signaling state occurring before the transition and a second symbol associated with a signaling state occurring after the transition.

23. The receiving of claim 22, wherein the second symbol corresponds to one of a number R of possible signaling states, where R is equal to $2^N-1$.

24. The receiving device of claim 23, wherein each possible signaling state of the N wires corresponds to a different one of a plurality of available symbols.

* * * * *